(12) United States Patent
Suzuki et al.

(10) Patent No.: US 8,199,386 B2
(45) Date of Patent: Jun. 12, 2012

(54) MEDIUM FOR PREVENTING FORGERY

(75) Inventors: Satomi Suzuki, Minami-ashigara (JP);
Hideki Kaneiwa, Minami-ashigara (JP);
Ichiro Amimori, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 382 days.

(21) Appl. No.: 12/485,303

(22) Filed: Jun. 16, 2009

(65) Prior Publication Data

US 2009/0310195 A1 Dec. 17, 2009

(30) Foreign Application Priority Data

Jun. 16, 2008 (JP) ................................ 2008-156593

(51) Int. Cl.
*G03H 1/00* (2006.01)
*B42D 15/00* (2006.01)

(52) U.S. Cl. .............................................. 359/2; 283/86
(58) Field of Classification Search ......... 359/2; 283/86
See application file for complete search history.

(56) References Cited

U.S. PATENT DOCUMENTS

| 6,496,287 | B1 | 12/2002 | Seiberle et al. |
| 2007/0053028 | A1* | 3/2007 | Ezra .................................... 359/2 |
| 2008/0143926 | A1* | 6/2008 | Amimori et al. ................. 349/75 |

FOREIGN PATENT DOCUMENTS

| EP | 1 189 079 A1 | 3/2002 |
| EP | 1 925 954 A2 | 5/2008 |
| GB | 2 328 180 A | 2/1999 |
| JP | 2005-91786 A | 4/2005 |
| JP | 4054071 B2 | 2/2008 |

OTHER PUBLICATIONS

Extended European Search Report issued in corresponding European Application dated Dec. 17, 2009.

* cited by examiner

*Primary Examiner* — Alessandro Amari
(74) *Attorney, Agent, or Firm* — Buchanan Ingersoll & Rooney PC

(57) ABSTRACT

A medium for preventing forgery having a hologram layer and at least one patterned optically anisotropic layer,
wherein the patterned optically anisotropic layer has two or more regions comprising different birefringence property, and
wherein all the regions are formed of the same composition.

9 Claims, 5 Drawing Sheets

| 120 |
|---|
| 123 |
| 122 |
| 112 |
| 121 |

(b)

| 112 |
|---|
| 122 |
| 123 |
| 120 |
| 130 |

*Fig. 4*

| 112 |
|---|
| 120 |
| 122 |
| 123 |
| 120 |
| 130 |

*Fig. 5*

| 122 |
|---|
| 124 |
| 120 |
| 112 |
| 120 |
| 123 |
| 130 |

Fig. 6

| 122 |
|---|
| 112 |
| 123 |
| 130 |

| 120 |
|---|
| 124 |
| 122 |
| 112 |
| 121 |

(b)

| 112 |
|---|
| 122 |
| 124 |
| 120 |
| 11-1 |

Fig. 8

| 112 |
|---|
| 120 |
| 122 |
| 124 |
| 120 |
| 11-1 |

Fig. 9

| 122 |
|---|
| 124 |
| 120 |
| 112 |
| 120 |
| 11-1 |

Fig. 10

| 112 |
|---|
| 120 |
| 11-1 |
| 120 |
| 124 |
| 122 |

Fig. 11

| 122 |
|---|
| 112 |
| 11-1 | ns
MEDIUM FOR PREVENTING FORGERY

FIELD OF THE INVENTION

The present invention relates to a medium for preventing forgery.

BACKGROUND OF THE INVENTION

Holograms are typically used as media for preventing forgery (counterfeiting); however, holograms which cannot be distinguished from genuine ones are now being produced. Therefore, an approach has been tried in which the hologram is combined with an anisotropic layer exhibiting birefringence and a code made visible through a polarizing plate is additionally provided.

Japanese Patent No. 4054071 discloses a medium for preventing forgery obtained by patterning an optical axis in an optically anisotropic layer produced by a crosslinked liquid crystal monomer using an alignment layer. Although there is a description about embodiments in which a laminar structure including the crosslinked liquid crystal monomer and the alignment layer is disposed on the hologram, there is no description about specific examples. Further, when the optically anisotropic layer is disposed on the hologram according to the production steps described in Japanese Patent No. 4054071, the hologram is affected by light irradiation or heat treatment used in the process so that it is conceivably difficult to practically provide the medium for preventing forgery. Furthermore, since the optical axis patterning steps are complicated, the production of the medium for preventing forgery comprising the combination of the hologram and the optically anisotropic layer in accordance with the method of Japanese Patent No. 4054071 is conceivably difficult. Moreover, in a method of patterning the optical axis by making retardation constant, it is difficult to change color hue unless the optically anisotropic layer is formed as a multilayer.

JP-A-2005-91786 ("JP-A" means unexamined published Japanese patent application) discloses a medium for preventing forgery having a hologram and an optically anisotropic layer, which is manufactured by providing the optically anisotropic layer by printing. However, it is difficult to obtain a clear latent image by uniformly aligning liquid crystals by printing. Further, since images become binary images consisting of inked spots and uninked spots in printing, realization of a more complicated forgery prevention design with an elevated effect is also difficult. Furthermore, since a transparent substrate is an essential constituent element in the medium for preventing forgery, the following problems are observed:

(1) When the medium for preventing forgery is used as a label, its thickness is large.
(2) There is a possibility of the medium for preventing forgery being separated and reused again and again.
(3) Due to the added-phase difference of the transparent substrate, the colors that can be rendered may be limited or the contrast in the latent image pattern may decline.

SUMMARY OF THE INVENTION

The present invention resides in a medium for preventing forgery having a hologram layer and at least one patterned optically anisotropic layer,
wherein the patterned optically anisotropic layer has two or more regions having different birefringence property, and wherein all the regions are formed of the same composition.

Other and further features and advantages of the invention will appear more fully from the following description, appropriately referring to the accompanying drawings.

BRIEF DESCRIPTION OF THE DRAWINGS

FIGS. 3(a) and 3(b) are schematic sectional views showing layer structures of examples of the medium for preventing forgery.
FIG. 4 is a schematic sectional view showing a layer structure of an example of the medium for preventing forgery.
FIG. 5 is a schematic sectional view showing a layer structure of an example of the medium for preventing forgery.
FIG. 6 is a schematic sectional view showing a layer structure of an example of the medium for preventing forgery.
FIGS. 7(a) and 7(b) are schematic sectional views showing layer structures of examples of the medium for preventing forgery.
FIG. 8 is a schematic sectional view showing a layer structure of an example of the medium for preventing forgery.
FIG. 9 is a schematic sectional view showing a layer structure of an example of the medium for preventing forgery.
FIG. 10 is a schematic sectional view showing a layer structure of an example of the medium for preventing forgery.
FIG. 11 is a schematic sectional view showing a layer structure of an example of the medium for preventing forgery.

DETAILED DESCRIPTION OF THE INVENTION

Figure 1:
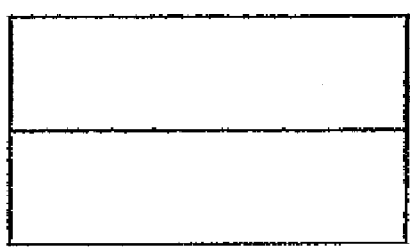
FIGS. 1(a) to 1(d) are schematic sectional views showing examples of the birefringent pattern builder.
Figure 1:
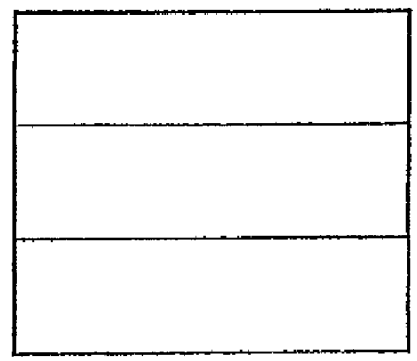
Figure 1:
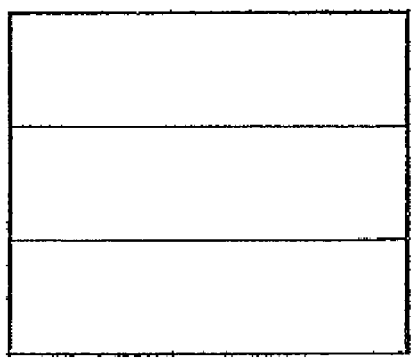
Figure 1:
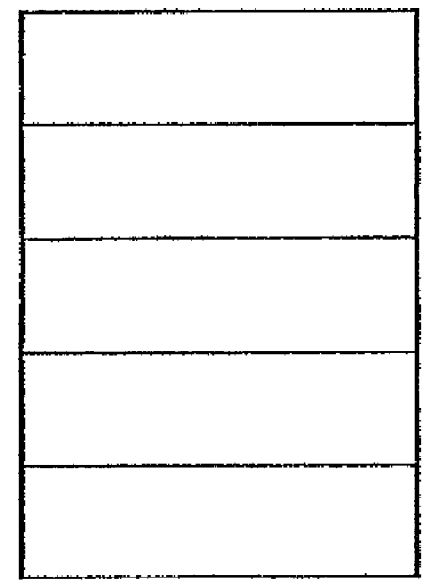

According to the present invention, there is provided the following means:

(1) A medium for preventing forgery having a hologram layer and at least one patterned optically anisotropic layer, wherein the patterned optically anisotropic layer has two or more regions having different birefringence property, and wherein all the regions are formed of the same composition.
(2) The medium for preventing forgery as described in the above item (1), wherein the direction of the optical axis in the patterned optically anisotropic layer is constant.
(3) The medium for preventing forgery as described in the above item (1) or (2), wherein a latent image consisting of three or more colors is made visible by observation through a polarizing plate.
(4) The medium for preventing forgery as described in any one of the above items (1) to (3), wherein the patterned optically anisotropic layer is a layer formed by polymerizing a liquid crystalline compound.
(5) The medium for preventing forgery as described in the above item (4), having a layer formed by a composition containing a polymerization initiator that initiates polymerization of at least a part of the liquid crystalline compound, which layer is adjacent to the patterned optically anisotropic layer.
(6) The medium for preventing forgery as described in any one of the above items (1) to (5), wherein the hologram layer and at least one patterned optically anisotropic layer are adjacent to with each other.
(7) The medium for preventing forgery as described in any one of the above items (1) to (6), comprising at least one reflective layer.
(8) The medium for preventing forgery as described in any one of the above items (1) to (7), which is a security thread.

(9) The medium for preventing forgery as described in any one of the above items (1) to (7), which is a label for preventing forgery.

Some examples of preferable modes of the present invention are described below in detail.

In the present specification, "to" denotes a range including numerical values described before and after it as a minimum value and a maximum value.

In the present specification, the term "medium for preventing forgery" means a sheet-like or a film-like medium having a laminated structure. No particular limitation is placed on use and it suffices for the medium to be one capable, for example, of being adhered or attached to an article to prevent forgery of the article and verify the manufacturer or the like of the article, or of verifying the manufacturer by the shape of a wrapping paper or the like.

In the present specification, the term "patterned optically anisotropic layer" means a layer having a layer comprising a plurality of different birefringence property regions. The regions different in birefringence property may be regions different in retardation and/or optical axis direction from each other. The regions are preferably different in retardation from each other. It is preferable for the direction of the optical axis in the patterned optically anisotropic layer to be constant. In other words, the different birefringence property regions preferably have the same direction of the optical axis. In the patterned optically anisotropic layer of the medium for preventing forgery of the present invention, the plurality of different birefringence property regions are all formed of the same compositions for layer formation. The difference of birefringence property may be suitably due to a molecular orientation or the like in the composition, as will be explained below. In the present specification, the laminate comprising the patterned optically anisotropic layer including the plurality of different birefringence property regions is sometimes called a birefringent pattern (patterned birefringent product).

Since the regions different in birefringence property are recognized when observed in a direction substantially normal to the medium for preventing forgery, it suffices for the regions to be divided by a plane parallel to the direction normal to the plane of the medium for preventing forgery.

Herein, in the present specification, the term "retardation" or "Re" means an in-plane retardation, and the term "Re($\lambda$)" indicates an in-plane retardation at wavelength $\lambda$ (nm). The in-plane retardation (Re($\lambda$)) can be measured by making light of wavelength $\lambda$ nm incident in the direction of the normal of the film, in KOBRA 21ADH or WR (each trade name, manufactured by Oji Scientific Instruments). In the present specification, retardation or Re means one measured at wavelength $\lambda$ 611±5 nm for R (Red), 545±5 nm for G (Green), or 435±5 nm for B (Blue), respectively, and denotes one measured at wavelength $\lambda$ 545±5 nm or 590±5 nm unless otherwise specified any of color.

It is also noted that the term "optical axis" in the context of the specification means "slow axis" or "transmission axis".

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than ±5% with respect to the precise values can be allowed. It is also to be noted that the term "The Re value is substantially not zero" in the context of the specification means that the Re value is 5 nm or more. The measurement wavelength for refractive indexes is any visible light wavelength, unless otherwise specified. It is also to be noted that the term "visible light" in the context of the specification means light of a wavelength falling within the range from 400 to 700 nm.

In the specification, "retardation disappearance temperature" means a temperature at which the retardation of the optically anisotropic layer becomes 30% or lower of the retardation at 20° C. of the same optically anisotropic layer when the temperature of the optically anisotropic layer is increased at the rate of 20° C./minute from the state of 20° C.

In the specification, "no retardation disappearance temperature at 250° C. or lower" means that the retardation of the optically anisotropic layer does not become 30% or lower of the retardation at 20° C. of the same optically anisotropic layer when the temperature of the optically anisotropic layer is increased in the same manner as described above until the temperature reaches 250° C.

[Birefringent Pattern Builder]

As is explained below, the patterned optically anisotropic layer may be an optically anisotropic layer produced by using a birefringent pattern builder.

FIGS. 1(a) to 1(d) are schematic sectional views showing several examples of the birefringent pattern builder. The birefringent pattern builder is a material for preparing birefringence pattern, and a material with which the patterned birefringent product comprising the optically anisotropic layer can be prepared by conducting the predetermined steps. The birefringent pattern builder shown in FIG. 1(a) is an example having an optically anisotropic layer 12 on a support (substrate) 11. The birefringent pattern builder shown in FIG. 1(b) is an example having an alignment layer 13 on the support 11. The alignment layer 13 functions as a layer for supporting the alignment/orientation of liquid crystalline compounds in the following case: as the optically anisotropic layer 12, a layer, which is formed by coating a substrate with a solution comprising the liquid crystalline compounds and drying the solution to thereby form a liquid crystal phase and then polymerizing and fixing the compounds by applying heat or irradiating ionizing radiation to the liquid crystal phase, is used. The birefringent pattern builder shown in FIG. 1(c) is an example having an adhesive layer 14 for transfer between the support 11 and the optically anisotropic layer 12 as it is prepared by using a transferring material. The birefringent pattern builder shown in FIG. 1(d) is an example having plural optically anisotropic layers (the first optically anisotropic layer 12F and the second optically anisotropic layer 12S) and plural adhesive layers for transfer (the first adhesive layer 14F for transfer and the second adhesive layer 14S for transfer).

[Birefringent Pattern]

FIGS. 2(a) to 2(d) are schematic sectional views showing several examples of the patterned birefringent product which can be obtained by the production method using the birefringent pattern builder. The patterned birefringent product has at least one layer of patterned optically anisotropic layer 112. The patterned birefringent product shown in FIG. 2(a) is an example consisting of only one patterned optically anisotropic layer 112. The exposed region (part) 112-A and unexposed region (part) 112-B are different in birefringence property from each other. The different birefringence property depending on the respective regions in a patterned optically anisotropic layer may be formed by heating in a patterned manner or the like. The patterned birefringent product may have a plurality of patterned optically anisotropic layers. The product having a plurality of patterned optically anisotropic layers can provide a further complicated latent image.

Figure 2:
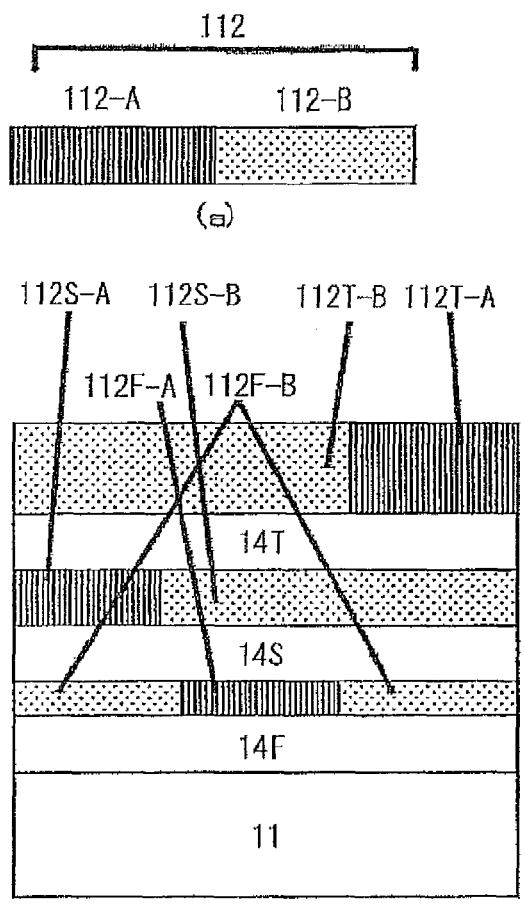
FIGS. 2(a) to 2(d) are schematic sectional views showing examples of the birefringent pattern.

The patterned birefringent product shown in FIG. 2(b) is an example in which a plurality of optically anisotropic layers (the first patterned optically anisotropic layer 112F-A (exposed region), the first patterned optically anisotropic layer 112F-B (unexposed region), the second patterned optically anisotropic layer 112S-A (exposed region), and the second patterned optically anisotropic layer 112S-B (unexposed region)) are laminated and then exposed to light in a patterned manner, to give the same pattern to the exposed part. Such a product is useful, for example, in producing a pattern containing a region having a large retardation that is not possible with only one optically anisotropic layer. The birefringent pattern shown in FIG. 2(*c*) is an example in which plurality of optically anisotropic layers are given with independent patterns (112F-A, 112F-B, 112S-A, 112S-B, the third patterned optically anisotropic layer 112T-A (exposed region), and the third patterned optically anisotropic layer 112T-B (unexposed region)) from one another. For example, this example is an example that is useful when it is desired that two or more optically anisotropic layers having different retardations or slow axes from one another are provided and are given with independent patterns, respectively. The independent patterns from one another can be formed, for example, by repeating a plurality of times a step of forming an optically anisotropic layer (including transfer), a step of conducting a processing such as a patterned light exposure or a pattern heating for forming regions having different retardations, and a step of a post processing such as baking in this order. The birefringent pattern shown in FIG. 2(*d*) is an example in which the formation of an optically anisotropic layer (including transfer) and the patterned light exposure are alternately repeated for a required number of times and then the formed layers are patterned by a single baking. By the similar method, while minimizing the number of bakings having a high process load, regions having different retardations from one another can be produced in a required number.

[Preparation Method of Patterned Optically Anisotropic Layer]

The patterned (patterning) optically anisotropic layer can be provided in accordance with a method comprising a step of carrying out a treatment such as a patterned light exposure, a patterned heating or so for forming different retardation regions onto the optically anisotropic layer. Although an optically anisotropic layer with self supporting property may be used as the optically anisotropic layer, it is also preferable that the patterned optically anisotropic layer is formed as the patterned birefringent product including the patterned optically anisotropic layer using a birefringent pattern builder having the optically anisotropic layer.

Hereinafter, description will be made in detail on the patterned optically anisotropic layer, the birefringent pattern builder, and the method of the patterned birefringent product. However, it is to be noted that the present invention is not limited to the embodiments below. Any other embodiments can be also carried out referring to the description below and known methods.

[Optically Anisotropic Layer]

The optically anisotropic layer in the birefringent pattern builder is the layer having at least one incident direction, of which retardation (Re) is not substantively zero when a phase difference is measured. In other words, the optically anisotropic layer is the layer having non-isotropic optical characteristic. The optically anisotropic layer preferably has a retardation disappearance temperature. Because the optically anisotropic layer has the retardation disappearance temperature, a retardation of a region of a part of an optically anisotropic layer can be caused to disappear by, for example, a patterned heating. The retardation disappearance temperature is preferably 20° C. or higher and 250° C. or lower, more preferably 40° C. to 245° C., further preferably 50° C. to 245° C., and most preferably 80° C. to 240° C.

In addition, as the optically anisotropic layer, an optically anisotropic layer of which the retardation disappearance temperature rises by light exposure to the birefringence pattern builder is used. As a result, differences in a retardation disappearance temperature will appear between both the unexposed part and the exposed part by patterned light exposure, baking the birefringent pattern builder at a temperature higher than the retardation disappearance temperature of the unexposed part and lower than the retardation disappearance temperature of the exposed part, only the retardation of the unexposed part can be selectively caused to disappear. Furthermore, the retardation disappearance temperature can be changed depending on an exposure amount.

The optically anisotropic layer preferably contains a polymer. By containing the polymer, the birefringence pattern builder can meet various requirements such as birefringence property, transparency, solvent-resistance, toughness, and flexibility. The polymer in the optically anisotropic layer preferably has an unreacted reactive group. The exposure to light causes an unreacted reactive group to react to thereby cause the crosslinking of a polymer chain, thus consequently allowing the retardation disappearance temperature to increase easily.

The production method of the optically anisotropic layer is not particularly limited. Examples include a method of conducting coating a solution comprising a liquid crystalline compound having at least one reactive group and drying the solution to thereby form a liquid crystal phase, and then applying heat or irradiating ionizing radiation for polymerization and fixation; a method of stretching a layer formed by polymerizing and fixing a monomer having two or more reactive groups; a method of stretching a layer consisting of polymer, after a reactive group is being introduced to the layer by using a coupling agent; and a method of stretching a layer consisting of polymer and then introducing a reactive group to the layer by using a coupling agent.

Further, as explained below, the optically anisotropic layer according to the present invention may be formed by transfer.

[Optically Anisotropic Layer Formed by Polymerizing and Fixing Composition Comprising Liquid Crystalline Compound]

The production method of the optically anisotropic layer is explained below, wherein coating with a solution comprising a liquid crystalline compound having at least one reactive group is conducted and the solution is dried to thereby form a liquid crystal phase, and then the liquid crystal phase is polymerized and fixed by applying heat or irradiating ionizing radiation. According to this method, it is easy to obtain an optically anisotropic layer which is thinner in thickness but has an equal retardation compared with the layer obtainable by the method of forming an optically anisotropic layer by stretching of polymer, which method will be explained later.

[Liquid-Crystalline Compound]

The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more kinds of rod-like liquid-crystalline compounds, a mixture of two or more kinds of discotic liquid-crystalline compounds, or a mixture of a rod-like liquid-crystalline compound and a discotic liquid-crystalline compound may also be used. It is more preferable that the optically anisotropic layer is formed using a rod-like liquid-crystalline compound having a reactive group or a discotic liquid-crystalline compound having a reactive group, because such a compound can reduce temperature- or moisture-dependent changes; and it is still further preferable that the optically anisotropic layer is formed using at least one compound having two or more reactive groups in a single liquid-crystalline molecule. The liquid-crystalline compound may be used in a form of a mixture of two or more kinds of compounds, wherein at least one of the compounds preferably has two or more reactive groups.

It is also preferred that liquid-crystalline compound has two or more kinds of reactive groups which have different polymerization condition to each other. In such a case, an optically anisotropic layer comprising a polymer having an unreacted reactive group can be produced by only polymerizing a specific kind of reactive group among plural types of reactive groups by selecting polymerization condition. The polymerization condition to be employed may be wavelength range of the irradiation of ionized radiation for the polymerization and fixing, or mechanism of polymerization. Preferably, the condition may be polymerization initiator, which can control polymerization of compound having a combination of a radically polymerizable group and a cationically polymerizable group. The combination of acrylic group and/or methacrylic group as the radically polymerizable group and vinyl ether group, oxetane group, and/or epoxy group as the cationically polymerizable group is particularly preferred, because the reactivity can be controlled easily.

Examples of the rod-like liquid-crystalline compound include azomethine compounds, azoxy compounds, cyanobiphenyl compounds, cyanophenyl esters, benzoates, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds. Not only the low-molecular-weight liquid-crystalline compounds as listed in the above, but also high-molecular-weight liquid-crystalline compounds may also be used. The high-molecular-weight liquid-crystalline compounds are compounds obtained by polymerizing a low-molecular-weight liquid-crystalline compound having a reactive group. Among such low-molecular-weight liquid-crystalline compounds, liquid-crystalline compounds represented by formula (I) are preferred.

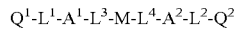  Formula (I)

In formula (I), $Q^1$ and $Q^2$ each independently represent a reactive group; $L^1$, $L^2$, $L^3$ and $L^4$ each independently represent a single bond or a divalent linking group; $A^1$ and $A^2$ each independently represent a spacer group having 2 to 20 carbon atoms; and M represents a mesogen group.

Hereinafter, the rod-shaped liquid crystalline compound having a reactive group represented by Formula (I) will be described in more detail. In formula (I), $Q^1$ and $Q^2$ each independently represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

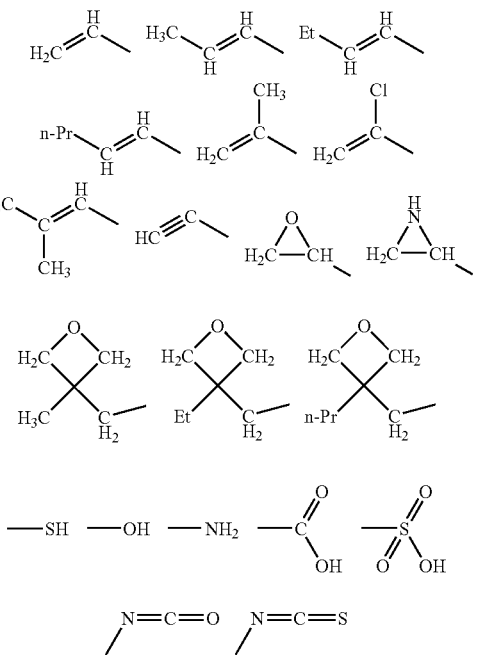

The divalent linking groups represented by $L^1$, $L^2$, $L^3$ and $L^4$ are preferably those selected from the group consisting of —O—, —S—, —CO—, —NR²—, —CO—O—, —O—CO—O—, —CO—NR²—, —NR²—CO—, —O—CO—, —O—CO—NR²—, —NR²—CO—O— and —NR²—CO—NR²—. $R^2$ represents an alkyl group having 1 to 7 carbon atoms or a hydrogen atom. In Formula (I), of the groups represented by a combination of $Q^1$ and $L^1$, or of $Q^2$ and $L^2$, $CH_2$=CH—CO—O—, $CH_2$=C($CH_3$)—CO—O—, and $CH_2$=C(Cl)—CO—O—CO—O— are preferable, and $CH_2$=CH—CO—O— is most preferable.

$A^1$ and $A^2$ each are a spacer group having 2 to 20 carbon atoms; preferably an alkylene, alkenylene or alkynylene group having 2 to 12 carbon atoms; and particularly preferably an alkylene group. The spacer group is more preferably has a chain form, and may contain non-neighboring oxygen atoms or sulfur atoms. The spacer group may have a substituent and may be substituted by a halogen atom (fluorine, chlorine, bromine), a cyano group, a methyl group or an ethyl group.

The mesogen group represented by M may be selected from any known mesogen groups, and is preferably selected from the group represented by the formula (II).

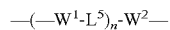  Formula (II)

In formula (II), $W^1$ and $W^2$ each independently represent a divalent cyclic alkylene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in the formula (I) and —CH$_2$—O— and —O—CH$_2$—. In formula (II), n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. As for 1,4-cyclohexane diyl, either structural isomers having trans-form or cis-form, or any mixture based on an arbitrary compositional ratio may be used in the present invention, where the trans-form is preferable. Each of $W^1$ and $W^2$ may have a substituent, where the examples of the substituent include halogen atoms (fluorine, chlorine, bromine, iodine), cyano group, alkyl groups having 1 to 10 carbon atoms (methyl, ethyl, propyl, etc.), alkoxy groups having 1 to 10 carbon atoms (methoxy, ethoxy, etc.), acyl group having 1 to 10 carbon atoms (formyl, acetyl, etc.), alkoxycarbonyl group having 1 to 10 carbon atoms (methoxycarbonyl, ethoxycarbonyl, etc.), acyloxy groups having 1 to 10 carbon atoms (acetyloxy, propionyloxy, etc.), nitro group, trifluoromethyl group and difluoromethyl group.

Basic skeletons of the preferable examples of the mesogen group represented by formula (II) are listed below. These groups may further be substituted by the above-described substituent.

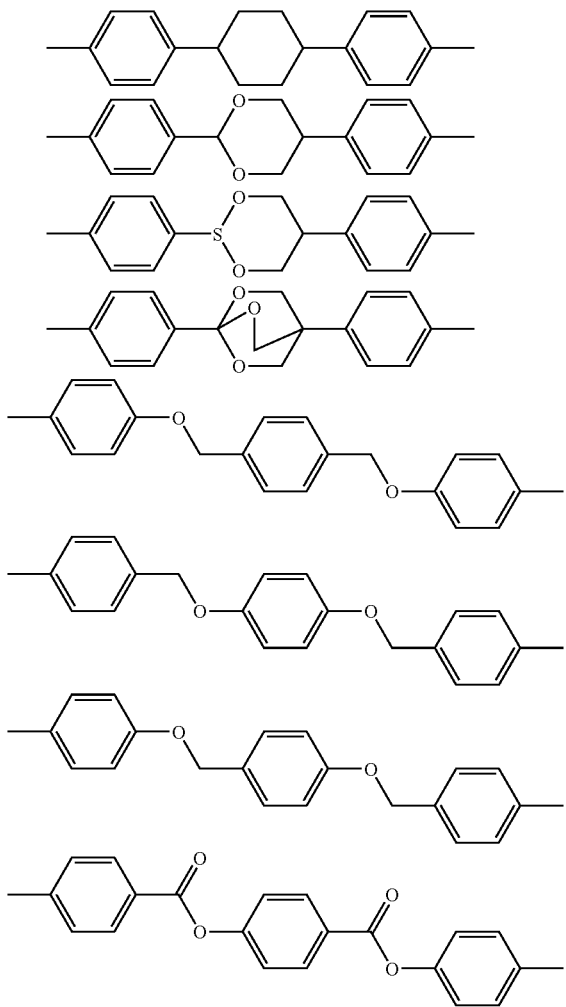

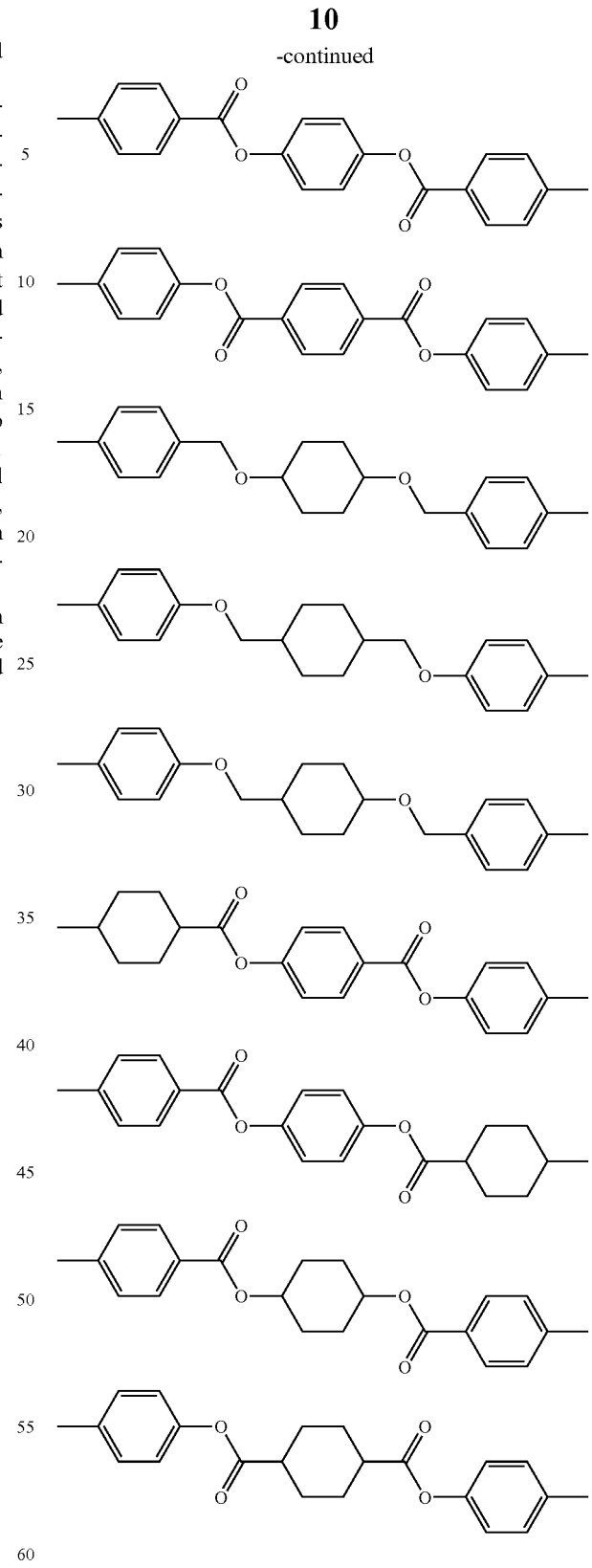

Examples of the compound represented by formula (I) include, but not to be limited to, those described below. The compounds represented by formula (I) may be prepared according to a method described in JP-T-11-513019 ("JP-T" means a published Japanese translation of PCT international application) (WO97/00600).

I-1
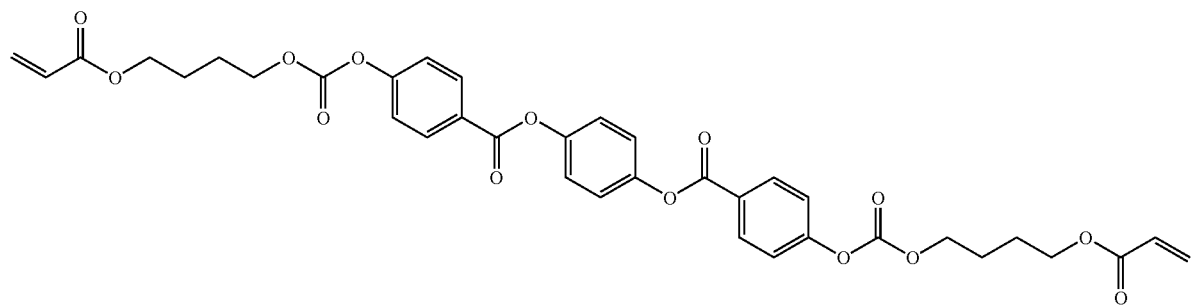
I-2
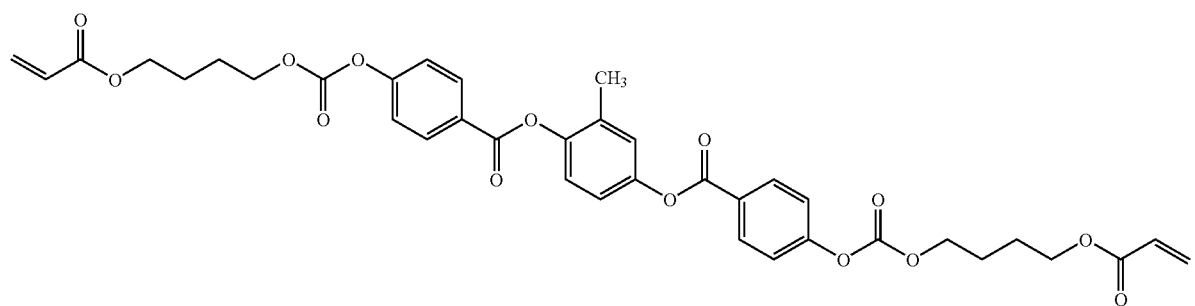
I-3
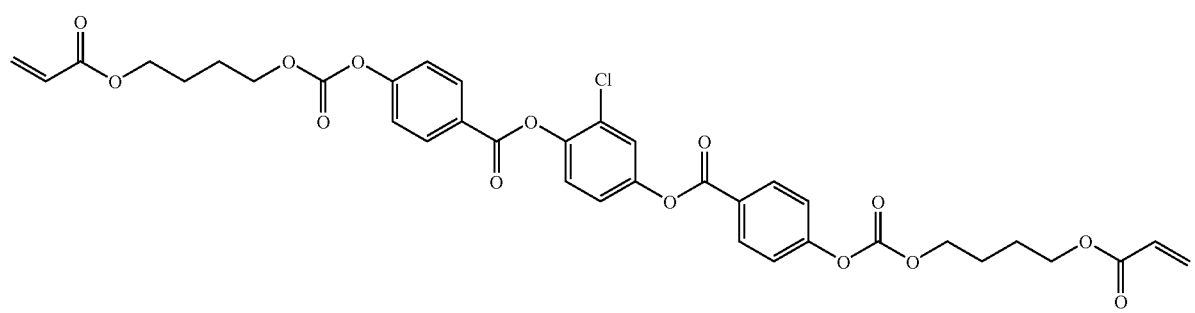
I-4
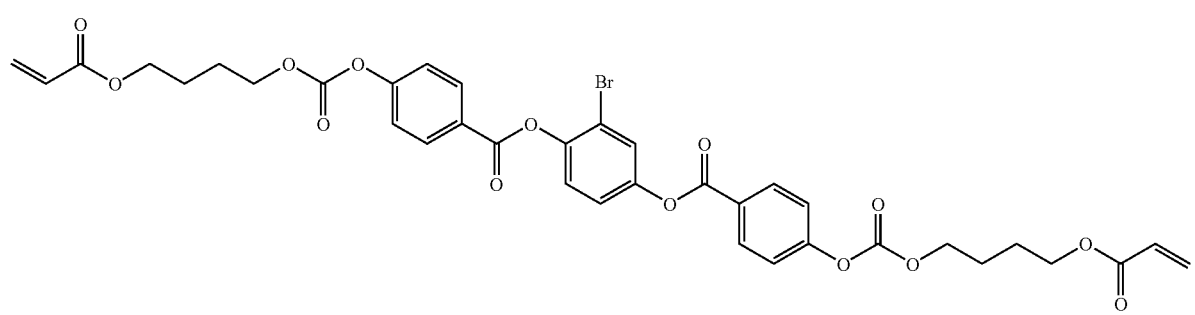
I-5
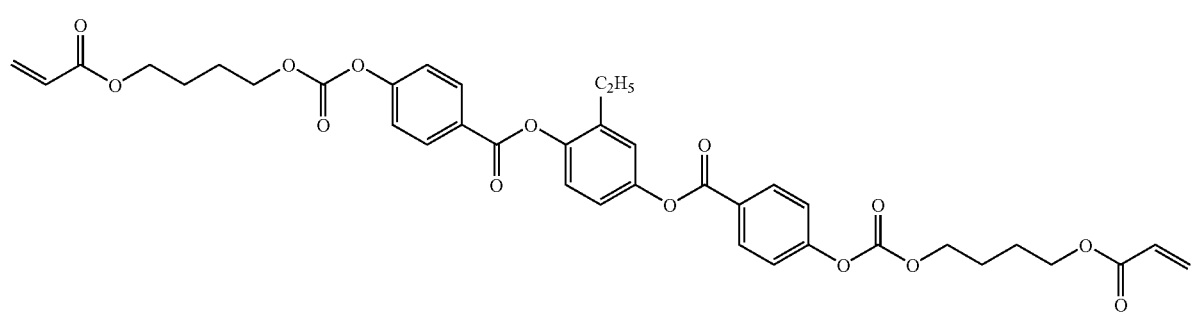

-continued
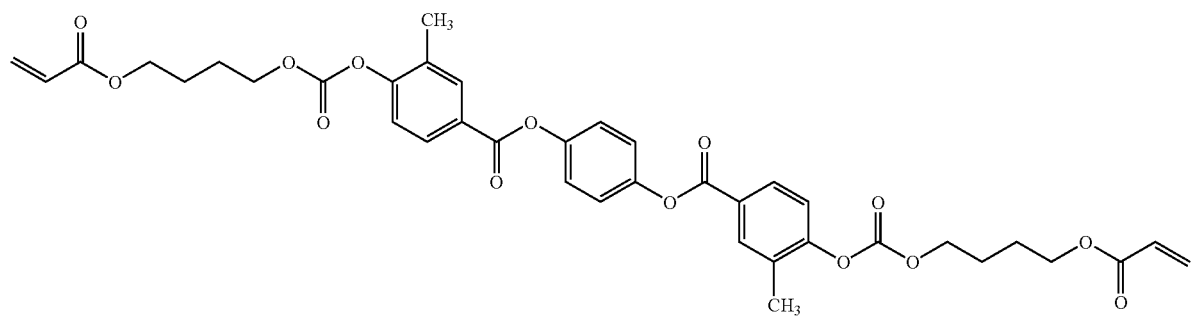
I-6
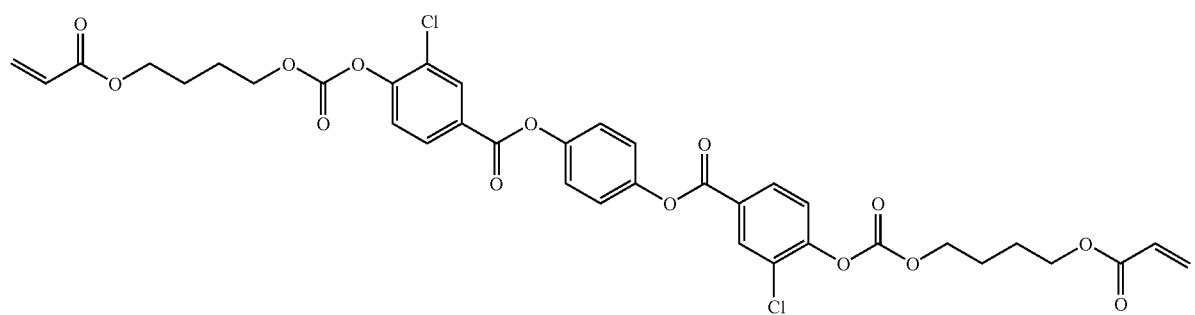
I-7
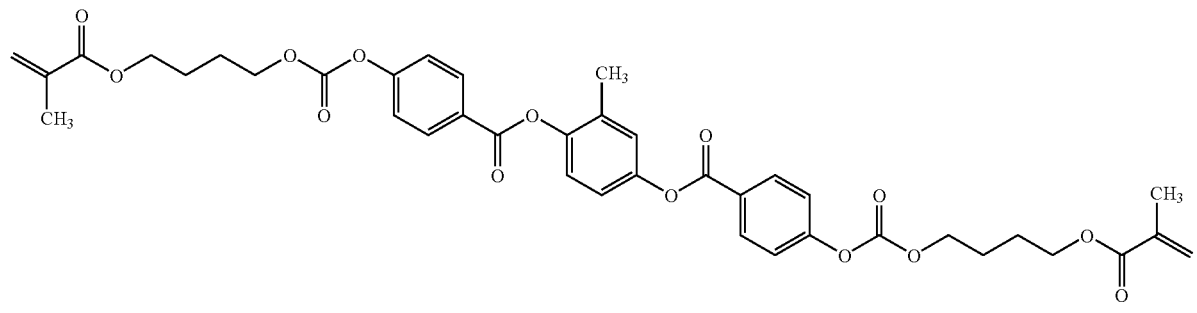
I-8
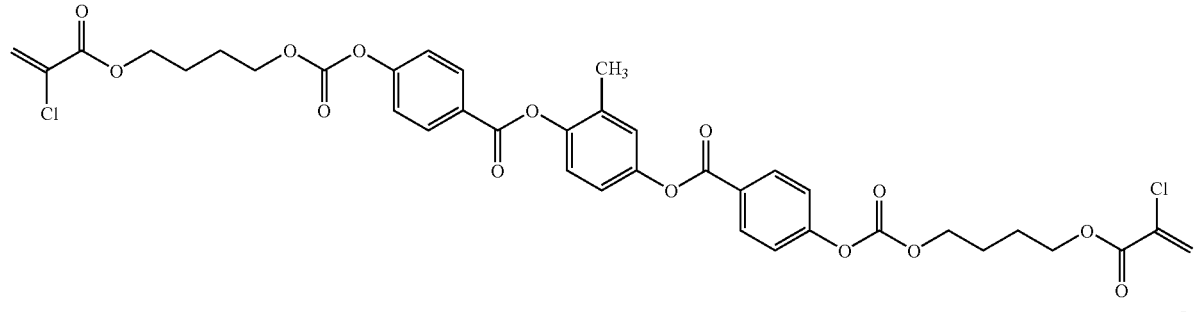
I-9
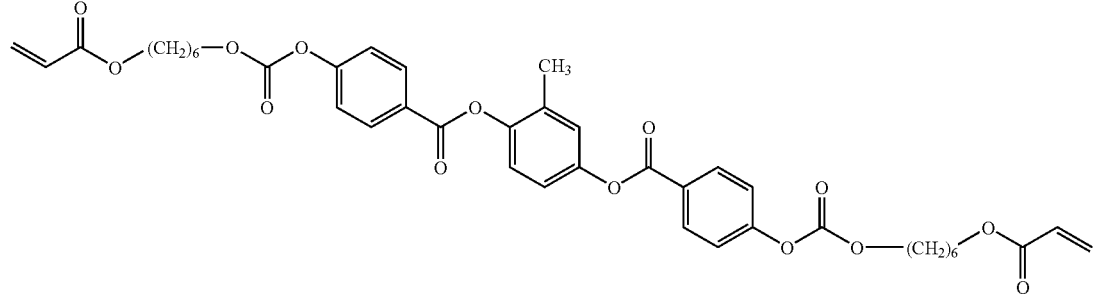
I-10

I-11
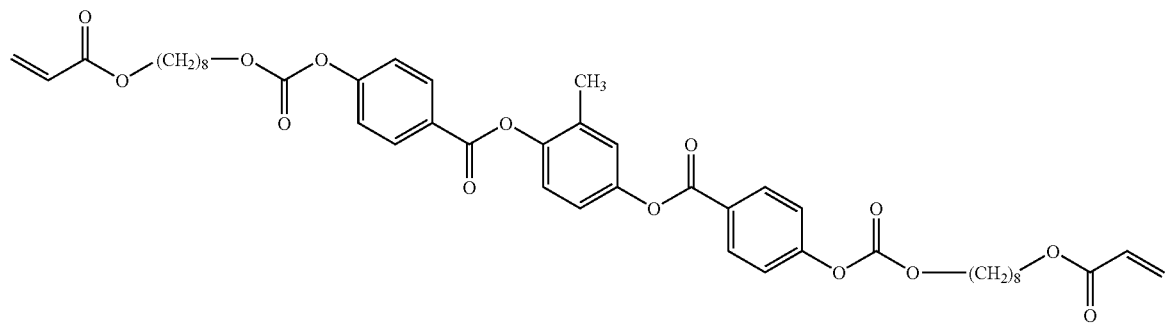
I-12
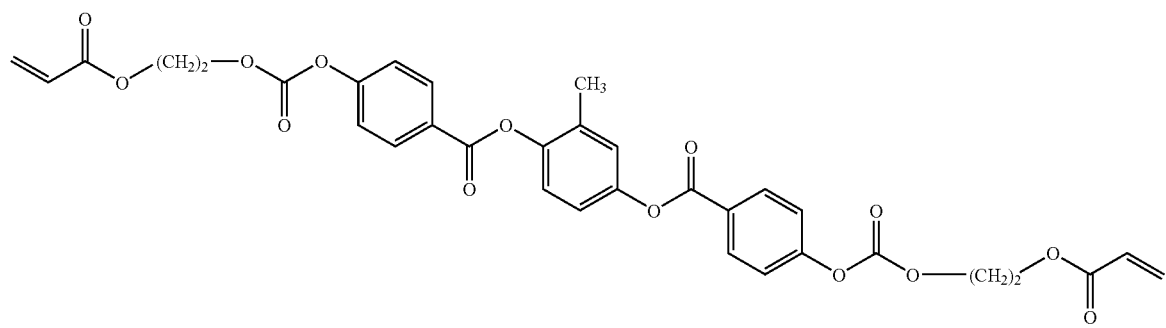
I-13
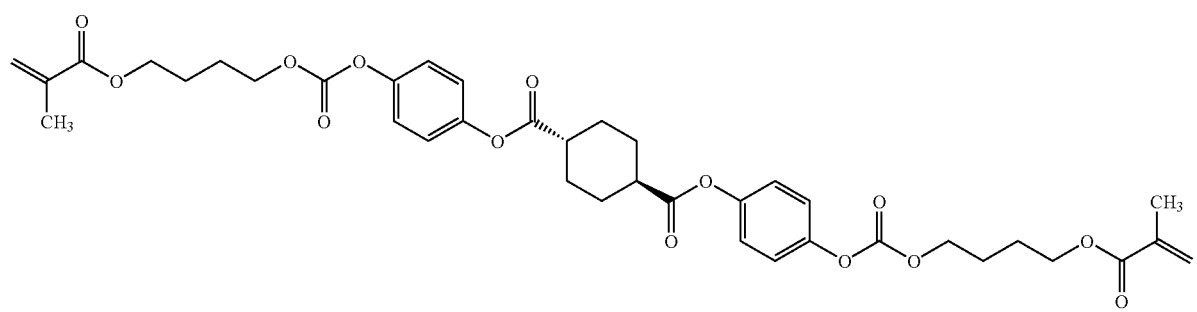
I-14
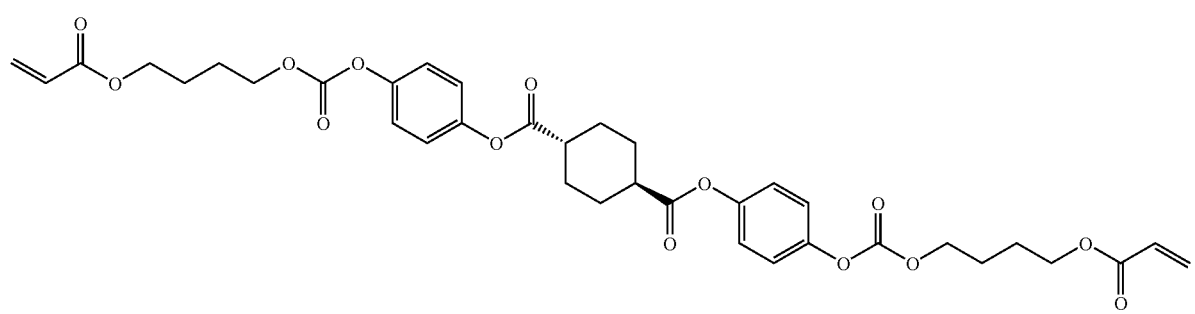

-continued
I-15
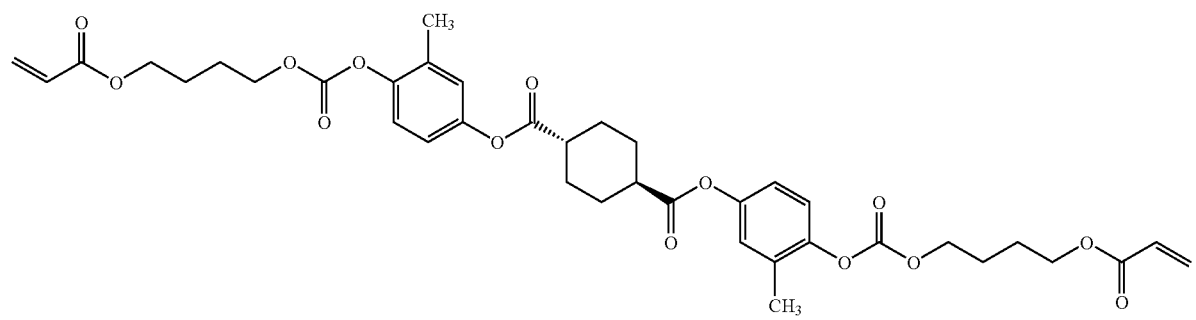
I-16
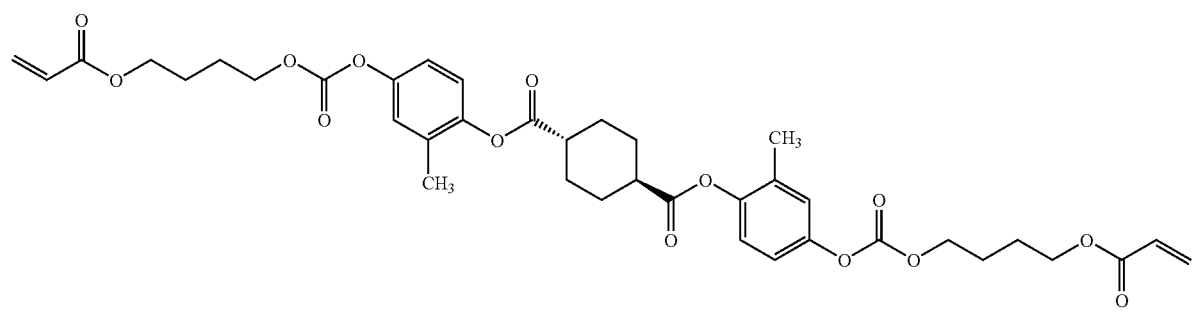
I-17
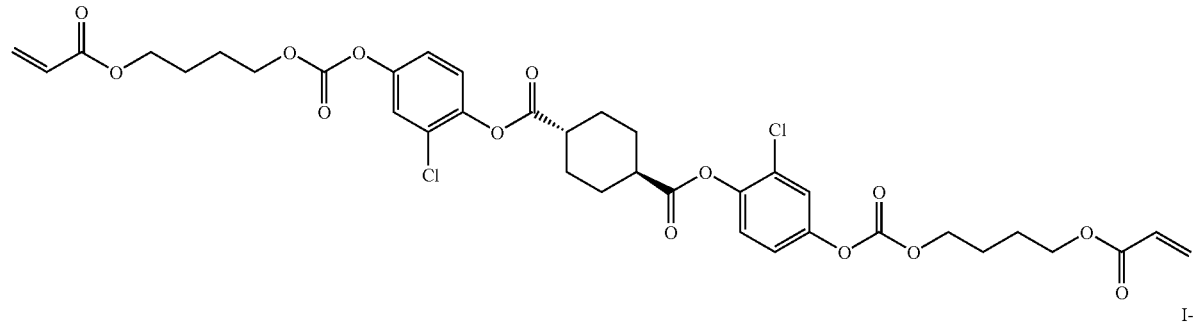
I-18
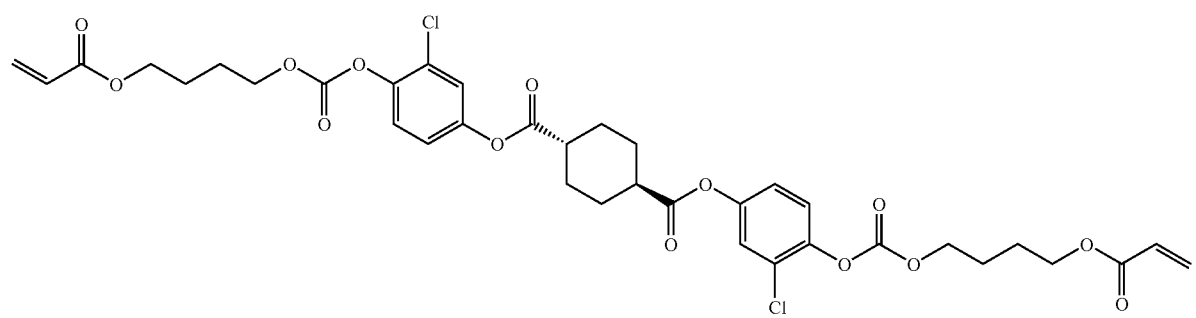
I-19
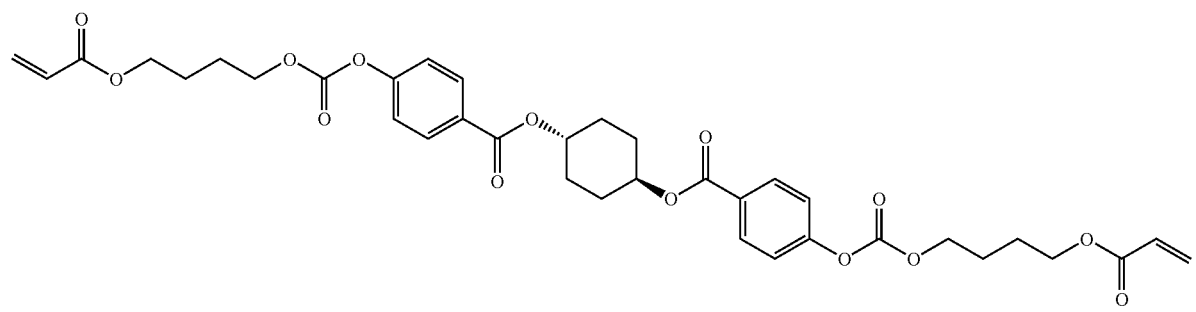

-continued

I-20
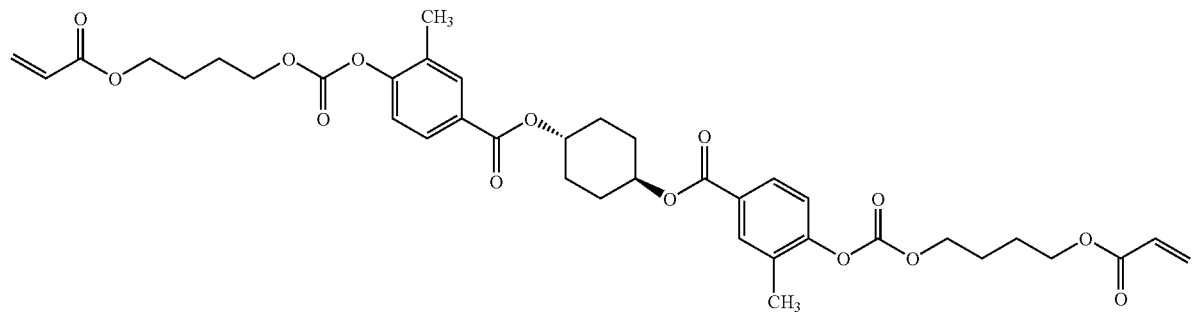

I-21
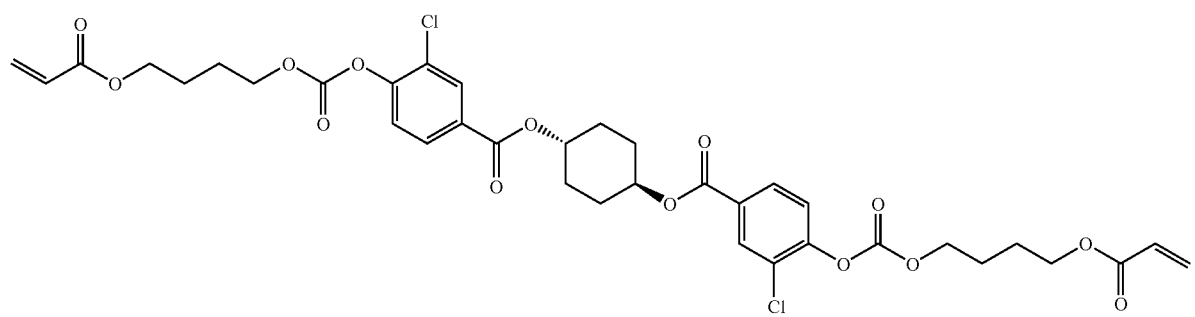

I-22
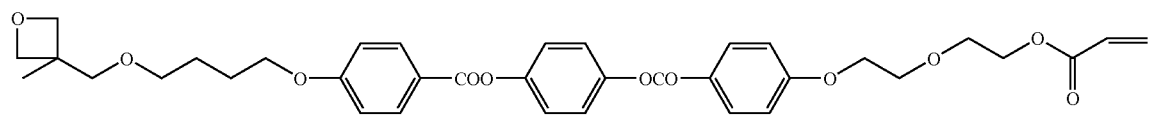

I-23
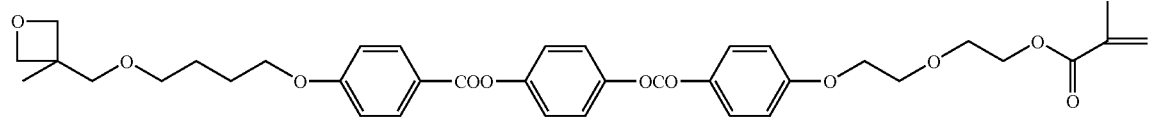

I-24
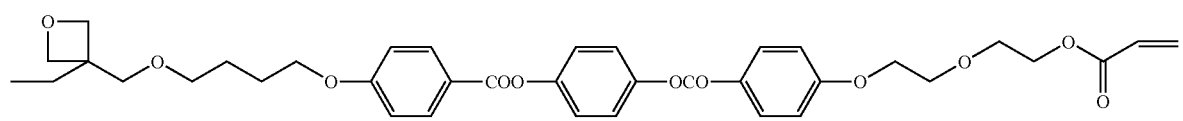

I-25
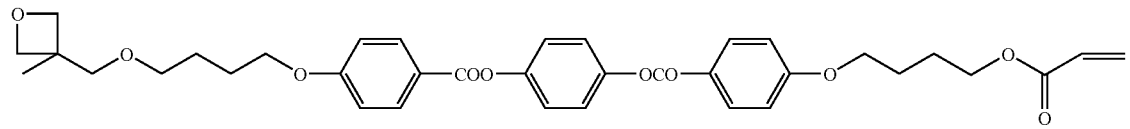

In another aspect of the present invention, a discotic liquid crystal is used in the optically anisotropic layer. The optically anisotropic layer is preferably a layer of a low-molecular-weight liquid-crystalline discotic compound such as monomer or a layer of a polymer obtained by polymerization (curing) of a polymerizable liquid-crystalline discotic compound. Examples of the discotic (disk-like) compounds include benzene derivatives disclosed in a study report of C. Destrade et al., Mol. Cryst., vol. 71, page 111 (1981); truxene derivatives disclosed in a study report of C. Destrade et al., Mol. Cryst., vol. 122, page 141 (1985), and Phyics. Lett., A, vol. 78, page 82 (1990); cyclohexane derivatives disclosed in a study report of B. Kohne et al., Angew. Chem. vol. 96, page 70 (1984); and azacrown series and phenylacetylene series macrocycles disclosed in a study report of J. M. Lehn et al., J. Chem. Commun. page 1794 (1985), and a study report of J. Zhang et al., J. Am. Chem. Soc. vol. 116, page 2655 (1994). The above mentioned discotic (disk-like) compounds generally have a discotic core in the central portion and groups (L), such as linear alkyl or alkoxy groups or substituted benzoyloxy groups, which are substituted radially from the core. Among them, there are compounds exhibiting liquid crystallinity, and such compounds are generally called as discotic liquid crystal. However, such molecular assembly in uniform orientation shows negative uniaxiality, although it is not limited to the description. In the specification, the term of "formed of a discotic compound" is used to mean not only when finally comprising the discotic compound as a low-molecular weight compound, but also when finally comprising a high-molecular weight discotic compound, no longer exhibiting liquid crystallinity, formed by carrying out polymerizing or crosslinking reaction of the low-molecular weight discotic compound having at least one reactive group capable of thermal reaction or photo reaction under heating or under irradiation of light.

In the present invention, it is preferred to use the discotic liquid-crystalline compound represented by formula (III).

$$D(-L-P)_n \qquad \text{Formula (III)}$$

In formula (III), D represents a disc core; L represents a divalent linking group; P is a polymerizable group; and n represents an integer of 4 to 12.

Preferable examples of the disc core (D), the divalent linking group (L) and the polymerizable group (P) in formula (III) are (D1) to (D15), (L1) to (L25), and (P1) to (P18), respectively, described in JP-A-2001-4837; and the contents of the patent publication are preferably employed in the present invention.

Preferred examples of the above discotic compound include compounds disclosed in paragraph Nos. [0045] to [0055] of JP-A-2007-121986.

The optically anisotropic layer is preferably a layer formed according to a method comprising applying a composition containing liquid crystalline compound (e.g., a coating liquid) to a surface of an alignment layer, described in detail later, aligning liquid crystalline molecules as to make an aligned state exhibiting a desired crystalline phase, and fixing the aligned state under applying heating or irradiating ionizing radiation.

When a discotic liquid crystalline compound having reactive groups is used as the liquid crystalline compound, the discotic molecules in the layer may be fixed in any alignment state such as a horizontal alignment state, vertical alignment state, tilted alignment state, and twisted alignment state. In the present specification, the term "horizontal alignment" means that, regarding rod-like liquid-crystalline molecules, the molecular long axes thereof and the horizontal plane of a support are parallel to each other, and, regarding discotic liquid-crystalline molecules, the disk-planes of the cores thereof and the horizontal plane of a support are parallel to each other. However, they are not required to be exactly parallel to each other, and, in the present specification, the term "horizontal alignment" should be understood as an alignment state in which molecules are aligned with a tilt angle against a horizontal plane less than 10°. The tilt angle is preferably from 0° to 5°, more preferably 0° to 3°, much more preferably from 0° to 2°, and most preferably from 0° to 1°.

When two or more optically anisotropic layers formed of the compositions containing liquid-crystalline compounds are stacked, the combination of the liquid-crystalline compounds is not particularly limited, and the combination may be a stack formed of layers all comprising discotic liquid-crystalline compounds, a stack formed of layers all comprising rod-like liquid-crystalline compounds, or a stack formed of a layer comprising discotic liquid-crystalline compounds and a layer comprising rod-like liquid-crystalline compounds. Combination of orientation state of the individual layers also is not particularly limited, allowing stacking of the optically anisotropic layers having the same orientation states, or stacking of the optically anisotropic layer having different orientation states.

The optically-anisotropic layer is preferably formed by applying a coating solution, which contains at least one liquid-crystalline compound, the following polymerization initiator and other additives, on a surface of an alignment layer described below. Organic solvents are preferably used as a solvent for preparing the coating solution, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone), and ethers (e.g., tetrahydrofuran, 1,2-dimethoxyethane). In particular, alkyl halides and ketones are preferable. Two or more kinds of organic solvents may be used in combination.

[Fixing of Liquid-Crystalline Compounds in an Alignment State]

It is preferred that the liquid-crystalline compounds in an alignment state are fixed without disordering the state. Fixing is preferably carried out by the polymerization reaction of the reactive groups contained in the liquid-crystalline compounds. The polymerization reaction includes thermal polymerization reaction using a thermal polymerization initiator and photo-polymerization reaction using a photo-polymerization initiator. Photo-polymerization reaction is preferred. Photo-polymerization reaction may be any of radical polymerization and cation polymerization. Examples of the radical photo-polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850), and oxadiazol compounds (described in U.S. Pat. No. 4,212,970). As the cationic-polymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

It is preferable to use the photopolymerization initiator in an amount of 0.01 to 20 mass %, more preferably 0.5 to 5 mass %, based on the solid content in the coating solution. In the photoirradiation for polymerizing the liquid crystalline compounds, it is preferable to use ultraviolet ray. The irradiation energy is preferably from 10 mJ/cm$^2$ to 10 J/cm$^2$, more preferably from 25 to 800 mJ/cm$^2$. Illuminance is preferably 10 to 1,000 mW/cm$^2$, more preferably 20 to 500 mW/cm$^2$, and further preferably 40 to 350 mW/cm$^2$. The irradiation wavelength has a peak falling within the range from preferably 250 to 450 nm, more preferably 300 to 410 nm. Irradiation may be carried out in an atmosphere of inert gas such as nitrogen gas and/or under heating to facilitate the photo-polymerization reaction.

[Fixing the Alignment State of Liquid-Crystalline Compounds Having Radically Reactive Group and Cationically Reactive Group]

As described above, it is also preferred that a liquid-crystalline compound has two or more kinds of reactive groups which have different polymerization condition to each other. In such a case, an optically anisotropic layer comprising a polymer having an unreacted reactive group can be produced by polymerizing only a specific kind of reactive groups among plural kinds of reactive groups by selecting polymerization condition. The conditions which are suitable for the polymerization and fixation of the liquid-crystalline compounds having radically reactive group and cationically reactive group (the aforementioned I-22 to I-25 as specific examples) are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The content of the photopolymerization initiator falls in the range preferably from 0.01 to 20% by mass, more preferably from 0.1 to 8% by mass, and further preferably from 0.5 to 4% by mass of the total solid content in the coating solution.

Second, light irradiation for the polymerization is preferably conducted by using ultraviolet ray. When the irradiation energy and/or illuminance are too high, non-selective reaction of both of the radically reactive group and cationically reactive group is of concern. In view of the above, the irradiation energy is preferably 5 to 500 mJ/cm$^2$, more preferably 10 to 400 mJ/cm$^2$, and particularly preferably 20 to 200 mJ/cm$^2$. The illuminance is preferably 5 to 500 mW/cm$^2$, more preferably 10 to 300 mW/cm$^2$, and particularly preferably 20 to 100 mW/cm$^2$. As the irradiation wavelength, the light has a peak falling within the range preferably from 250 to 450 nm, more preferably from 300 to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

[Horizontal Orientation Agent]

At least one kind of compound selected from the group consisting of the compounds represented by formula (1), (2) or (3) described in paragraph Nos. [0068] to [0072] of JP-A-2007-121986, and fluorine-containing homopolymer or copolymer using the monomer represented by formula (4), which are shown below, may be added to the composition used for forming the optically anisotropic layer, in order to align the molecules of the liquid-crystalline compounds substantially horizontally.

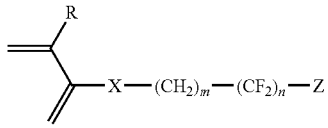

Formula (4)

In formula (4), R represents a hydrogen atom or a methyl group, X represents an oxygen atom or a sulfur atom, Z represents a hydrogen atom or a fluorine atom; m represents an integer of 1 to 6, and n represents an integer of 1 to 12. In addition to the fluorine-containing polymer prepared by using the monomer represented by formula (4), the polymer compounds described in JP-A-2005-206638 and JP-A-2006-91205 can be used as horizontal orientation agents for reducing unevenness in coating. The methods of preparation of the compounds are also described in the publications.

The amount of the horizontal orientation agents added is preferably 0.01 to 20% by mass, more preferably 0.01 to 10% by mass, and most preferably 0.02 to 1% by mass with respect to the mass of the liquid crystalline compound. The compounds represented by any of the aforementioned formulae (1) to (4) may be used singly, or two or more types of them may be used in combination.

[Optically Anisotropic Layer Produced by Stretching]

The optically anisotropic layer may be produced by stretching a polymer. When a polymer in the optically anisotropic layer, which is preferred to have at least one unreacted reactive group as described above, is produced, a polymer having a reactive group may be stretched or a reactive group may be introduced by using a coupling agent or the like to an optically anisotropic layer prepared by stretching. The characteristics of the optically anisotropic layer obtained by stretching include low cost, self-supporting property (a support is not needed when the layer is formed or maintained), and the like.

[Post-Treatment of Optically Anisotropic Layer]

Various post-treatments may be conducted to modify the optically anisotropic layer produced. Examples of the post treatments include corona treatment for improving adhesiveness, addition of a plasticizer for improving plasticity, addition of a heat polymerization inhibitor for improving storage stability, and coupling treatment for improving reactivity. When the polymer in the optically anisotropic layer has an unreacted reactive group, addition of a polymerization initiator suited to the reactive group may also be a useful modification method. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterned light exposure afterward can be promoted. As the method of addition of the plasticizer or the photopolymerization initiator, examples include immersing the optically anisotropic layer in a solution of the desired additive, and applying a solution of the desired additive to the optically anisotropic layer for the permeance of the solution. Further, when another layer is applied to the optically anisotropic layer, the desired additive may be added to the coating solution of the layer for permeance to the optically anisotropic layer.

[Birefringent Pattern Builder]

The birefringent pattern builder is a material for producing a patterned birefringent product having a patterned optically anisotropic layer, and a material from which birefringence pattern can be obtained by proceeding predetermined steps. The birefringent pattern builder may generally be in a shape of film or sheet. The birefringent pattern builder may include a functional layer which can be applied with various accessory functions, other than the optically anisotropic layer. Examples of the functional layer include a support, and an alignment layer. Further, the birefringent pattern builder used as a transferring material or the birefringent pattern builder produced by using a transferring material may include a temporary support, an adhesive layer for transfer, or a dynamic property control layer.

[Support]

The birefringent pattern builder may include a support for the purpose of maintaining the dynamic stability. Although the support used for the birefringent pattern builder is not particularly limited, it is preferable to be the support provided in the shape of being easily separated after forming all the layers. Alternatively, it is preferable to be a layer (for example, either a layer or a support for surface protection) capable of functioning as a part of the medium for preventing forgery of the present invention without being separated as it is after forming all the layers. Regarding with such a layer, a transparent layer is preferable. Further, it is preferable to be a layer whose retardation is 10 nm or smaller.

Regarding with the support in the case of being separated after forming the hologram layer and the reflective layer, it is preferable to be a flexible support. As a flexible support, examples include plastic films such as cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. In view of the convenience of handling, the thickness of the flexible support is preferably 10 to 1,000 μm, and more preferably 15 to 200 μm.

In the case where the support is used without separating it, various supports can be used depending on their use. For example, in the case where a transparent support is used as a surface protecting layer or a surface protecting support, the above-mentioned plastic films can be suitably used. Further, in the case of using as the support, glass may be used depending on its use. Furthermore, in the case of using as a shrink film, a polypropylene film or a polyethylene film can be favorably used. The support is preferred to have heat-resistance sufficient for preventing coloring or deformation in the after-mentioned baking step.

[Support Which Serves as an Alignment Layer]

In order to align the liquid crystal layer, a method of forming an alignment layer onto the support and subjecting the surface of the alignment layer to a rubbing treatment is in general. However, depending on the combination of a coating liquid and a support, it is also possible to align the liquid crystal layer by directly rubbing the support. Examples of such a support include a support having an organic compound, particularly a polymer preferably used for the alignment layer that is described below as its major component. Examples of such a support include PET film, polyimide film, etc.

[Alignment Layer]

As described above, an alignment layer may be used for forming the optically anisotropic layer. The alignment layer may be generally formed on the surface of a support or a temporary support, or on the surface of an undercoating layer formed on the support or the temporary support. The alignment layer has function of controlling the alignment direction of liquid crystalline compounds provided thereon, and, as far as having such a function of giving the alignment to the optically anisotropic layer, may be selected from various known alignment layers. The alignment layer that can be employed in the present invention may be provided by rubbing a layer formed of an organic compound (preferably a polymer), oblique vapor deposition of an inorganic compound, formation of a layer with microgrooves, or the deposition of ω-tricosanoic acid, dioctadecylmethylammonium chloride, methyl stearate or the like by the Langmuir-Blodgett (LB) film method. Further, alignment layers in which dielectric is oriented by applying an electric or magnetic field are also exemplified.

Examples of the organic compound, which can be used for forming the alignment layer, include polymers such as polymethyl methacrylate, acrylic acid/methacrylic acid copolymer, styrene/maleimide copolymer, polyvinyl alcohol, poly (N-methylol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, and polycarbonates; and compounds such as silane coupling agents. Preferred examples of the polymer include polyimide, polystyrene, styrene based polymers, gelatin, polyvinyl alcohol and alkyl-modified polyvinyl alcohol having at least one alkyl group (preferably an alkyl group having carbon atoms of 6 or more).

For formation of an alignment layer, a polymer may preferably used. The types of the polymer, which can be used for forming the alignment layer, may be decided depending on what types of alignment of liquid crystalline compound (in particular, the average tilt angle). For example, for forming an alignment layer capable of aligning liquid crystalline compounds horizontally, a polymer which does not lower the surface energy of the alignment layer (a usual polymer for forming alignment layer) is used. Specifically, kinds of such a polymer are described in various documents concerning liquid crystal cells or optical compensation sheets. For example, polyvinyl alcohols, modified polyvinyl alcohols, copolymers with polyacrylic acid or polyacrylate, polyvinyl pyrrolidone, cellulose and modified cellulose are preferably used. Materials used for producing the alignment layer may have a functional group capable of reacting with the reactive group of the liquid crystalline compound. Examples of the polymer having such a functional group include polymers comprising a repeating unit having such a functional group in the side chain, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in JP-A-9-152509, which has an acrylic group introduced in the side chain thereof using acid chloride or Karenz MOI (trade name, manufactured by Showa Denko K. K.). The thickness of the alignment layer is preferably 0.01 to 5 μm, and more preferably 0.05 to 2 μm. The alignment layer may function as an oxygen insulation layer.

Polyimide film which has been widely used as an alignment layer for LCD (preferably a layer composed of a fluorine-atom-containing polyimide) is also preferable as the organic alignment layer. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, baking at 100 to 300° C. for 0.5 to one hour to form a polymer layer, and rubbing a surface of the polymer layer.

The rubbing treatment may be carried out with known techniques which have been employed in the usual step for aligning of liquid crystal of LCD. In particular, the rubbing treatment may be carried out by rubbing a surface of the alignment layer in a direction, with paper, gauze, felt, rubber, nylon or polyester fiber or the like. The rubbing treatment is generally carried out, for example, by rubbing for several times with a cloth having the same length and the same diameter fibers grafted uniformly.

Examples of a deposition material used in inorganic oblique vapor deposition film include metal oxides such as $SiO_2$, which is a typical material, $TiO_2$ and ZnO; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed by depositing on an immobile film (a support) or on a long film fed continuously.

[Two or More Optically Anisotropic Layers]

The birefringent pattern builder may have two or more optically anisotropic layers. The two or more optically anisotropic layers may be adjacent to each other in direction of the normal line, or may sandwich another functional layer. The two or more optically anisotropic layers may have almost the same retardation to each other, or different retardation to each other. The slow axes of them may be in the same direction to each other, or different direction to each other.

[Method of Producing Birefringent Pattern Builder]

The method of producing the birefringent pattern builder is not particularly limited. For example, the birefringent pattern builder may be produced by: directly forming an optically anisotropic layer on a support; transferring an optically anisotropic layer on a support by using another birefringent pattern builder used as a transferring material; forming a self-supporting optically anisotropic layer; forming another functional layer on a self-supporting optically anisotropic layer; attaching a self-supporting optically anisotropic layer to a support; or the like. Among these, in view of avoiding limitation to the property of the optically anisotropic layer, a method of direct formation of an optically anisotropic layer on a support and a method of transfer of an optically anisotropic layer on a support by using a transferring material are preferred. Further, in view of avoiding limitation to the support, a method of transferring of an optically anisotropic layer on a support by using a transferring material is more preferred.

As the method for producing the birefringent pattern builder having two or more optically anisotropic layers, the birefringent pattern builder may be produced by, for example, directly forming an optically anisotropic layer on a birefringent pattern builder; transferring an optically anisotropic layer on a birefringent pattern builder by using a different birefringent pattern builder as a transferring material. Among these, transfer of an optically anisotropic layer on a birefringent pattern builder by using another birefringent pattern builder as a transferring material is more preferable.

A birefringent pattern builder used as a transferring material will be explained in the followings. A birefringent pattern builder used as a transferring material may be referred to as "transferring material for producing a birefringence pattern" in the specification especially in the after-mentioned Examples.

[Temporary Support]

The birefringent pattern builder used as a transferring material is preferred to have a temporary support. The temporary support is not particularly limited and may be transparent or opaque. Examples of the polymer, which can constitute a temporary support, include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of optical property examination in a manufacturing process, the support is preferably selected from transparent and low-birefringence polymer films. From the view point of the low-birefringence property, cellulose ester films and norbornene based polymer films are preferable. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

[Adhesive Layer for Transfer]

The transferring material is preferred to have an adhesive layer for transfer. The adhesive layer for transfer is not particularly limited as far as the layer is transparent and non-colored, and has sufficient property for transfer. Examples include a photo-sensitive resin layer, adhesive layer using an adhesive agent, a pressure-sensitive resin layer, and a heat-sensitive resin layer. Among these, the photo-sensitive resin layer and the heat-sensitive resin layer are preferred in view of heat-resistance (resistance to baking).

The photosensitive resin layer may be formed of a photosensitive resin composition, for which either of positive type and negative type is acceptable, and commercial resist material may also be used. When used as an adhesive layer for transfer, adhesiveness is preferably exhibited by light irradiation. The photosensitive resin layer is preferably formed of a resin composition comprising at least a polymer, a monomer or oligomer, and a photopolymerization initiator or photopolymerization initiator systems. With regard to the polymer, monomer or oligomer, and a photo-polymerization initiator or photo-polymerization initiator systems, the description in paragraph Nos. [0082] to [0085] of JP-A-2007-121986 can be referred to.

The photo-sensitive resin layer preferably includes appropriate surfactant from the view point of effectively preventing unevenness. With regard to surfactant, the description in [0095] to [0105] of JP-A-2007-121986 can be referred to.

The adhesive agent for the adhesive layer is preferred to exhibit, for example, good optical transparency, suitable wettability, cohesiveness and adhesiveness. Specific examples are adhesive agents prepared using a suitable base polymer such as an acrylic-based polymer, silicone-based polymer, polyester, polyurethane, polyether, or synthetic rubber. The adhesive characteristics of the adhesive layer can be suitably controlled by conventionally known methods. These include adjusting the composition and/or molecular weight of the base polymer forming the adhesive layer, and adjusting the degree of crosslinking and/or the molecular weight thereof by means of the crosslinking method, the ratio of incorporation of crosslinking functional groups, and the crosslinking agent blending ratio.

The pressure-sensitive resin layer is not specifically limited as far as it exhibits adhesiveness when pressure is applied. Various adhesives, such as rubbers, acrylics, vinyl ethers, and silicones, can be employed as the pressure-sensitive adhesive. The adhesives may be employed in the manufacturing and coating stages in the form of solvent adhesives, non-water-based emulsion adhesives, water-based emulsion adhesives, water-soluble adhesives, hot melt adhesives, liquid hardening adhesives, delayed tack adhesives, and the like. Rubber adhesives are described in Shin Kobunshi Bunko 13 (the New Polymer Library 13), "Nenchaku Gijutu (Adhesion Techniques)," Kobunshi Kankokai (K. K.), p. 41 (1987). Examples of the vinyl ether adhesives include vinyl ether comprised mainly of alkyl vinyl ether compounds having 2 to 4 carbon atoms, and vinyl chloride/vinyl acetate copolymers, vinyl acetate polymers, polyvinyl butyrals, and the like, to which a plasticizer is admixed. With respect to the silicone adhesives, rubber siloxane can be used to impart film formation and condensation strength of the film, and resinous siloxane can be used to impart tackiness or adhesiveness.

The heat-sensitive resin layer is not specifically limited as far as it exhibits adhesiveness when heat is applied. Examples of the heat-sensitive adhesives include hot-melt compounds and thermoplastic resins. Examples of the hot-melt compounds include low molecular weight compounds in the form of thermoplastic resins such as polystyrene resin, acrylic resin, styrene-acrylic resin, polyester resin, and polyurethane resin; and various waxes in the form of vegetable waxes such as carnauba wax, Japan wax, candelilla wax, rice wax, and auricury wax; animal waxes such as beeswax, insect waxes, shellac, and whale wax; petroleum waxes such as paraffin wax, microcrystalline wax, polyethylene wax, Fischer-Tropshe wax, ester wax, and oxidized waxes; and mineral waxes such as montan wax, ozokerite, and ceresin wax. Further examples include rosin, hydrogenated rosin, polymerized rosin, rosin-modified glycerin, rosin-modified maleic acid resin, rosin-modified polyester resin, rosin-modified phenol resin, ester rubber, and other rosin derivatives; as well as phenol resin, terpene resin, ketone resin, cyclopentadiene resin, aromatic hydrocarbon resin, aliphatic hydrocarbon resin, and alicyclic hydrocarbon resin.

These hot-melt compounds preferably have a molecular weight of, usually 10,000 or less, particularly 5,000 or less, and a melting or softening point desirably falling within a range of 50° C. to 150° C. These hot-melt compounds may be used singly or in combinations of two or more. Examples of the above-mentioned thermoplastic resin include ethylene series copolymers, polyamide resins, polyester resins, polyurethane resins, polyolefin series resins, acrylic resins, and cellulose series resins. Among these, the ethylene series copolymers are preferably used.

[Dynamic Property Control Layer]

Between the temporary support and the optically anisotropic layer of the transferring material, a dynamic property control layer to control mechanical characteristics and conformity to irregularity may be preferably provided. The dynamic property control layer preferably exhibit flexible elasticity, is softened by heat, or fluidize by heat. A thermoplastic resin layer is particularly preferred for the dynamic property control layer. The component used in the thermoplastic resin layer is preferably an organic polymer substance described in JP-A-5-72724. The substance can be preferably selected from organic polymer substances having a softening point of about 80° C. or lower according to the Vicat method (specifically, the method of measuring a polymer softening point according to American Material Test Method ASTMD 1235). More specifically, examples include: a polyolefin such as polyethylene or polypropylene; an ethylene copolymer such as a copolymer of ethylene and vinyl acetate or a saponified product thereof; a copolymer of ethylene and an acrylate or a saponified product thereof; polyvinyl chloride; a vinyl chloride copolymer such as a copolymer of vinyl chloride and vinyl acetate or a saponified product thereof; a polyvinylidene chloride; a vinylidene chloride copolymer; polystyrene; a styrene copolymer such as a copolymer of styrene and a (meth)acrylate or a saponified product thereof; polyvinyl toluene; a vinyltoluene copolymer such as a copolymer of vinyltoluene and a (meth)acrylate or a saponified product thereof; a poly(meth)acrylate; a (meth)acrylate copolymer such as a copolymer of butyl (meth)acrylate and vinyl acetate; and a polyamide resin such as a vinyl acetate copolymer nylon, a copolymerized nylon, N-alkoxymethylated nylon, and N-dimethylaminated nylon.

[Intermediate Layer]

The transferring material preferably has an intermediate layer for the purpose of preventing mixing of the components during coating of a plurality of layers and during storage after the coating. The oxygen shut-off film having an oxygen shut-off function described as "separation layer" in JP-A-5-72724 or the above-described alignment layer for generating optical anisotropy is preferably used as the intermediate layer. Particularly preferably among them is a layer containing a mixture of polyvinylalcohol or polyvinylpyrrolidone and one or more derivatives thereof. One layer may work simultaneously as the above thermoplastic resin layer, oxygen shut-off layer, and alignment layer.

[Delamination Layer]

The birefringent pattern builder used as a transferring material may include a delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as the alignment layer and the dynamic property control layer may function as the delamination layer.

[Surface Protecting Layer]

A thin surface protecting layer is preferably provided on the resin layer for protecting the above layers against contamination or damage upon storage. The property of the surface protecting layer is not particularly limited and the surface protecting layer may be formed of the same or a similar material to that of the temporary support. The surface protecting layer should be readily separated from the layer adjacent thereto (for example an adhesive layer for transfer). As the material for the surface protecting layer, silicon paper, polyolefin, or polytetrafluoroethylene sheet is suitable.

[Forming Method of Layer]

The individual layers of the optically anisotropic layer, photosensitive resin layer, adhesive layer for transfer, adhesive layer which is explained below, and optionally-formed alignment layer, thermoplastic resin layer, dynamic property control layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761, 791, 2,941,898, 3,508,947, 3,526,528, and in "Kotingu Kogaku (Coating Engineering)", written by Yuji Harazaki, p. 253, published by Asakura Shoten (1973).

When the layer immediately above the optically anisotropic layer (for example, the adhesive layer for transfer) is applied to the optically anisotropic layer, the coating liquid may be added with a plasticizer or a photopolymerization initiator. Thereby, the modification of the optically anisotropic layer may be conducted simultaneously by penetration of these additives.

[Transferring Method of Transferring Material to Target Material of Transfer]

Methods of transferring the transferring material on a target material of transfer are not specifically limited, so far as the optically anisotropic layer can be transferred onto the target material of transfer such as a support (substrate). For example, the transferring material in a film form may be attached so that the surface of the adhesive layer for transfer is faced to the surface of the target material of transfer, then pressing under heating or no-heating with rollers or flat plates, which are heated and/or pressed by a laminator. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target material of transfer include a support, a laminated structure which is comprised of a support and another functional layer, and a birefringent pattern builder.

[Steps Included in Transfer]

The temporary support may be separated or not be separated after the transfer of a transferring material for producing a birefringent pattern on the target material of transfer. When the temporary support is not separated, the temporary support preferably has transparency suited for the patterned light exposure afterwards and heat-resistance sufficient for surviving the baking step. A step for removing unwanted layers which has been transferred with the optically anisotropic layer may be included in the method. For example, when polyvinyl alcohol/polyvinylpyrrolidone copolymer is used in the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

After transferring the birefringent pattern builder, other layer may be formed on the surface remained after the separation of the temporary support or the removal of the unwanted layers, according to need. Another transferring material may be transferred on the surface remained after the separation of the temporary support or the removal of the unwanted layers, according to need. The transferring material may be the same or different from the previously transferred transferring material. Further, the slow axis of the optically anisotropic layer in the first transferred transferring material may be in the same or different direction from that of the slow axis of the optically anisotropic layer in the second transferred transferring material. As described above, transferring plural optically anisotropic layers is useful for production of a birefringence pattern having large retardation with plural optically anisotropic layers stacked so that the directions of the slow axes are the same, and a specific birefringence pattern with plural optically anisotropic layers stacked so that the directions of the slow axes are different to each other.

[Production of Birefringent Pattern]

By conducting the method including a step of using the birefringent pattern builder to conduct a pattern-like heat treatment or irradiation of ionizing radiation and a step of causing the remaining unreacted reactive group in the optically anisotropic layer to react or deactivate in this order, a patterned birefringent product can be produced. In particular, when the optically anisotropic layer has a retardation disappearance temperature and the retardation disappearance temperature increases by the irradiation of ionizing radiation (or the heat treatment at a temperature equal to or lower than the retardation disappearance temperature), a patterned birefringent product can be produced easily.

The pattern-like irradiation of ionizing radiation may be, for example, exposure to light (patterned light exposure). The step of causing a remaining unreacted reactive group in the optically anisotropic layer to react or deactivate may be an overall exposure or an overall heat treatment (baking). For saving cost, the heating at a temperature higher than the retardation disappearance temperature of the unexposed region and lower than the retardation disappearance temperature of the exposed region also can preferably provide a heat treatment for reaction.

The pattern-like heat treatment also may be conducted by another method as described below. In this method, a region is firstly heated at a temperature close to the retardation disappearance temperature to reduce or disappear the retardation. Thereafter, the step of causing a remaining unreacted reactive group in the optically anisotropic layer to react or deactivate (overall exposure or overall heating) at a temperature lower than the retardation disappearance temperature to thereby obtain a birefringent pattern. In this case, a pattern can be obtained in which the retardation of only the firstly-heated region is lost.

[Patterned Light Exposure]

The patterned light exposure for producing a birefringent pattern may be conducted so that a region in the birefringent pattern builder in which birefringence properties are desired to be left is exposed. An optically anisotropic layer in the exposed region has an increased retardation disappearance temperature. The method of patterned light exposure may be a contact light exposure using a mask, proximity light exposure, projected light exposure, or direct drawing by focusing on the predetermined point by using laser or electron beam without a mask. The irradiation wavelength of the light source for the light exposure preferably has a peak in the range of 250 to 450 nm, and more preferably in the range of 300 to 410 nm. When a photosensitive resin layer is used to form different levels (unevenness) at the same time, it is also preferred that light in a wavelength region at which the resin layer can be cured (e.g., 365 nm, 405 nm) is irradiated to the resin layer. Specific examples of the light source include extra-high voltage mercury lamp, high voltage mercury lamp, metal halide lamp, and blue laser. Energy of exposure generally falls in the range preferably from about 3 $mJ/cm^2$ to about 2,000 $mJ/cm^2$, more preferably from about 5 $mJ/cm^2$ to about 1,000 $mJ/cm^2$, further preferably from about 10 $mJ/cm^2$ to about 500 $mJ/cm^2$, and most preferably from about 10 $mJ/cm^2$ to about 100 $mJ/cm^2$.

In a case where the birefringent property should be controlled pixel by pixel, it is appropriate to control the exposure amount to be irradiated pixel by pixel. In the light exposure using a mask, a plurality of the light exposure with each different exposure amount using a mask with each different pattern may be suitable, or controlling the exposure amount using a density mask may be also suitable. In the viewpoint of productivity, the latter is preferable.

Another transferring material for producing birefringence pattern builder is transferred on the laminated structure obtained by conducting patterned light exposure to a birefringence pattern builder, and then another patterned light exposure may be conducted. In this case, the retardation values retained after baking can be effectively changed among the region which is a region unexposed to light both in the first and second exposures (generally having the lowest retardation value), the region which is a region exposed to light in the first exposure but a region unexposed to light in the second exposure, and the region which is a region exposed to light both in the first and second exposures (generally having the highest retardation value). The region which is unexposed at the first time but is exposed at the second time is considered to be equal, upon the second time, to the region which is exposed at both the first and second times. In a similar manner, four or more regions can be readily formed, by conducting transfer and patterned light exposure alternately three, four or more times.

[Overall Heat Treatment (Baking)]

Birefringence pattern can be produced by applying heat to the birefringence pattern builder after patterned light exposure at 50 to 400° C., preferably 80 to 400° C. When the retardation disappearance temperature of the optically anisotropic layer in the birefringence pattern builder used for forming birefringence pattern before the light exposure is referred to as T1 (° C.), and the retardation disappearance temperature after the light exposure as T2 (° C.), (provided that when the retardation disappearance temperature is not in the range of the temperature of 250° C. or lower, T2=250), the temperature of baling is preferably T1° C. or higher and T2° C. or lower, more preferably (T1+10)° C. or higher and (T2−5)° C. or lower, and most preferably (T1+20)° C. or higher and (T2−10)° C. or lower.

By baking, the retardation in the region unexposed to light in the birefringence pattern builder lowers, whereas the retardation in the region exposed to light, in which retardation disappearance temperature has risen by the previous patterned light exposure, lowers only slightly, absolutely does not lower, or rises. As a result, the retardation in the region unexposed to light is smaller than that in the region exposed to light, enabling production of birefringence pattern (a patterned optically anisotropic layer).

Alternatively, another transferring material for producing birefringence pattern builder may be transferred on the birefringence pattern builder which has been baked, and then a patterned light exposure and baking may be conducted thereon. In this case, the retardation values after the second baking can be effectively changed between the region which is region unexposed to light both in the first and second exposure, the region which is region exposed to light in the first exposure and region unexposed to light in the second exposure, the region which is a region unexposed to light in the first exposure and region exposed to light in the second exposure (the retardation of the region unexposed to light in the first exposure already disappears due to the baking), and the region which is region exposed to light both in the first and second exposure. This method is useful when two regions having birefringence of different slow-axis directions to each other are needed to be formed without overlap to each other.

[Pattern-Like Heat Treatment (Writing of Heat Pattern)]

The heating temperature of pattern-like heat treatment is not limited and may be any temperature so long as the temperature causes a heated part and a non-heated part to have different retardations. When a heated part desirably has retardation of substantially 0 nm in particular, it is preferred to conduct the heating at a temperature equal to or higher than the retardation disappearance temperature of the optically anisotropic layer of the birefringent pattern builder used. On the other hand, the heating temperature is preferably lower than a temperature at which the optically anisotropic layer is burned or colored. The heating may be generally performed at a temperature in a range from about 120° C. to about 260° C., more preferably in a range from 150° C. to 250° C., and further preferably in a range from 180° C. to 230° C.

Although the method of heating a part (region) of a birefringent pattern builder is not particularly limited, such methods may be used including a method of causing a heating body to have a contact with a birefringent pattern builder, a method of providing or placing a heating body in the close vicinity of a birefringent pattern builder, and a method of using a heat mode exposure to partially heat a birefringent pattern builder.

[Reaction Processing by Overall Heat Treatment (Baking) at Temperature Equal to or Lower than Retardation Disappearance Temperature or Overall Exposure]

A region that is in an optically anisotropic layer subjected to the pattern-like heat treatment and not subjected to a heat treatment still includes an unreacted reactive group while retaining the retardation, and thus is still in an unstable status. In order to react or deactivate the unreacted reactive group remaining in the not-treated region, a reaction processing by an overall heat treatment or an overall exposure is preferably conducted.

The reaction processing by an overall heat treatment is conducted preferably at a temperature lower than the retardation disappearance temperature of an optically anisotropic layer of the birefringent pattern builder used that efficiently promotes the reaction or deactivation of the unreacted reactive group. Generally, the heating at about 120 to 180° C. may be conducted, 130 to 170° C. is more preferred, and 140 to 160° C. is further preferred. However, a suitable temperature changes depending on required birefringence properties (retardation) or the thermal curing reactivity of an optically anisotropic layer used. The time of the heat treatment is not particularly limited. The time of the heat treatment is preferably 1 minute or more and 5 hours or less, the time of 3 minutes or more and 3 hours or less is more preferred, and the time of 5 minutes or more and 2 hours or less is particularly preferred.

The reaction processing also can be conduced by an overall exposure instead of the overall heat treatment. In this case, the irradiation wavelength of a light source preferably has a peak in a range from 250 to 450 nm and more preferably in a range from 300 to 410 nm. When the photo-sensitive resin layer is used to form different levels at the same time, irradiation of light having a wavelength region at which the resin layer can be cured (e.g., 365 nm, 405 nm) is also preferred. Specific examples of the light source include extra-high-pressure mercury lamp, high-pressure mercury lamp, metal halide lamp, and blue laser. Exposure amount generally falls in the range preferably from about 3 mJ/cm$^2$ to about 2,000 mJ/cm$^2$, more preferably from about 5 mJ/cm$^2$ to about 1,000 mJ/cm$^2$, further preferably from about 10 mJ/cm$^2$ to about 500 mJ/cm$^2$, and most preferably from about 10 mJ/cm$^2$ to about 300 mJ/cm$^2$.

[Finishing Heat Treatment]

When the birefringent pattern produced by the steps according to the preceding sections is desired to have a further-improved stability, a finishing heat treatment also may be performed for the purpose of further reacting unreacted reactive groups still remaining after the fixing to increase the durability, and for the purpose of evaporating or burning an unnecessary component in the material to remove such a component. In particular, the finishing heat treatment is effective when a birefringent pattern is produced by a patterned light exposure and a overall heating or by a pattern-like heat treatment and an overall exposure. The finishing heat treatment may be performed at a temperature from about 180 to about 300° C., more preferably from 190 to 260° C., and further preferably from 200 to 240° C. The time of the heat treatment is not particularly limited. However, the time of the heat treatment is preferably 1 minute or more and 5 hours or less, more preferably 3 minutes or more and 3 hours or less, and particularly preferably 5 minutes or more and 2 hours or less.

[Birefringence Pattern]

The product obtained by conducting light exposure and baking as above to the birefringence pattern builder is normally colorless and transparent, but when it is sandwiched by two polarizing plates, or by one polarizing plate and one reflective layer, the product exhibits characteristic contrast or color, and becomes readily identifiable with the naked eye. That is, the patterned birefringent product is normally almost invisible with the naked eye, whereas, through a polarizing plate, the patterned birefringent product can exhibit multi-colored image which can be readily identified. A copy of the birefringence pattern without any polarizing plate exhibits no image, whereas a copy through a polarizing plate exhibits a permanent pattern which is visible with the naked eye without any polarizing plate. Therefore, the reproduction of the birefringence pattern is difficult. Such kind of method of producing birefringence pattern is not widely spread, and needs unusual or special kind of material. Therefore, the patterned birefringent product can be considered to be favorably adapted as means of preventing forgery.

[Functional Layer to be Laminated on Birefringence Pattern]

The birefringent pattern may be laminated with functional layers with various functions. Although the functional layer is not particularly limited, examples include such the same adhesive layer for transfer as the foregoing description. It is possible to form the medium for preventing forgery of the present invention by attaching or adhering the birefringence pattern comprising the patterned optically anisotropic layer formed as the above description using the adhesive layer for transfer onto the support having the hologram layer.

[Layer Structure]

The medium for preventing forgery of the present invention has the hologram layer and the patterned optically anisotropic layer. The hologram can be used singly as a label for preventing forgery; however, its combination with the patterned birefringent product that forms a latent image improves the property for preventing forgery.

Schematic sectional views showing examples of layer structure about the medium for preventing forgery of the present invention are illustrated in FIGS. 3(a), 3(b), 4, 5, 6, 7(a), 7(b), 8, 9, 10 and 11. FIGS. 3(a), 3(b), 4, 5 and 6 are schematic sectional views showing examples of the medium for preventing forgery which visually recognize the birefringence pattern by reflection; and FIGS. 7(a), 7(b), 8 and 9 are schematic sectional views showing examples of the medium for preventing forgery which visually recognize the birefringence pattern by transmission, or of the medium for preventing forgery which visually recognize the birefringence pattern by reflection using another reflective article. In the following figures, only the minimum necessary layers are illustrated, however, the medium for preventing forgery of the present invention may have appropriately an alignment layer for aligning the liquid crystal and a layer for supplying a polymerization initiator into the optically anisotropic layer except the layers illustrated in the figures.

FIG. 3(a) is a schematic sectional view showing an example of the medium for preventing forgery usable as a transfer foil. After forming the patterned optically anisotropic layer 112 onto the temporary support 121, the hologram layer 122, the reflective layer 123, and the adhesive layer 120 are formed in this order. FIG. 3(b) is a schematic sectional view showing an example of transferring the transfer foil illustrated in FIG. 3(a) onto the article 130. By using the transfer foil in FIG. 3(a), a medium for preventing forgery having both the birefringence pattern and hologram together can be obtained in accordance with one transfer process.

FIG. 4 is a schematic sectional view showing an example of the medium for preventing forgery formed by further transferring the patterned optically anisotropic layer 112 that is formed onto the temporary support after transferring the known hologram foil on a article 130.

FIG. 5 is a schematic sectional view showing an example of the medium for preventing forgery formed by further transferring the known transparent hologram foil after transferring the patterned optically anisotropic layer 112 that is formed onto the temporary support on the article 130 onto which a reflective layer 123 is provided.

FIG. 6 is a schematic sectional view showing an example of the medium for preventing forgery made by forming a reflective layer 123 directly on a article 130, subsequently the birefringence pattern, and thereupon, directly a hologram layer 122. In this case, it is necessary for the article 130 to have a resistance against the light exposure process and the heating process for formation of the birefringence pattern.

FIG. 7(a) is a schematic sectional view showing an example of the medium for preventing forgery in which the reflective layer 123 in the examples of FIG. 3(a) is designed as transparent thin film 124. FIG. 7(a) illustrates an example of the medium for preventing forgery usable as a transfer foil. The birefringence pattern can be visually recognized with transmission by transferring it onto the transparent support 11-1 as shown in FIG. 7(b). Alternatively, the birefringence pattern can be also visually recognized with reflection by disposing a reflective article onto either an upper surface or a lower surface of the medium for preventing forgery in FIG. 7(b).

FIG. 8 is a schematic sectional view showing an example of the medium for preventing forgery made by replacing the reflective layer 123 with transparent thin film 124 and replacing the article 130 with a transparent support 11-1 respectively in the example shown in FIG. 4.

FIG. 9 is a schematic sectional view showing an example of the medium for preventing forgery made by replacing the reflective layer 123 and the article 130 with transparent support 11-1 in the example shown in FIG. 5.

FIG. 10 is a schematic sectional view showing an example of the medium for preventing forgery made by attaching a hologram layer 122 from one surface of the transparent support 11-1 and attaching the patterned optically anisotropic layer 112 from the other surface of the transparent support 11-1.

FIG. 11 is a schematic sectional view showing the similar example of the medium for preventing forgery as shown in FIG. 6, except removing the reflective layer 123 and replacing the article 130 with the transparent support 11-1.

For the purpose of making hologram duplication difficult, it is more preferable that the patterned optically anisotropic layer exists in the upper layer than the hologram layer. By the above structure, measured light correction pixel by pixel in the patterned optically anisotropic layer becomes necessary in order for duplicating the hologram in the lower layer, thereby enhancing the difficulty in duplication.

[Forming of Hologram Layer]

The hologram layer may be formed either onto the patterned birefringent product made in accordance with the above description, or may be formed by transferring the birefringence pattern on to the support having the hologram layer.

In the case where the hologram layer is formed onto the patterned birefringent product, it is preferred that the hologram layer is formed onto the patterned optically anisotropic layer in the patterned birefringent product. For example, when the patterned birefringent product has the support, it is preferred that the hologram layer is formed onto the surface in the opposite side of the support. Further, it is preferred that the uppermost surface of the opposite side is the patterned optically anisotropic layer.

In the case where the birefringence pattern is transferred to the hologram layer, it is preferred that an adhesive layer for transfer is provided onto the surface where the birefringence pattern in the patterned birefringent product is to be transferred to the hologram layer. The usage of the transfer provides the patterned optically anisotropic layer onto the commercially available hologram and enables to produce the medium for preventing forgery of the present invention.

Also, the commercially available hologram transfer foil may be transferred to the patterned birefringent product.

[Hologram Layer]

The kind of the hologram is not particularly limited, and either a relief hologram or a volume hologram is appropriate. Although the former is superior regarding with productivity, the latter is superior in the viewpoint of the property for preventing forgery.

With regards to the various kinds of the hologram material, "Holography Material/Application Manual" (Junpei Tsujiuchi supervision, 2007) can be referred to. In addition, description in JP-A-2004-177636 and JP-A-2005-91786 can be referred to about the formation of the relief hologram layer. Among those, typical methods are explained below.

Regarding with hologram resins to be used as materials for the formation of the hologram layer, any one of the thermoplastic resin, thermosetting resin, ultraviolet ray setting resin or electron beam setting resin which is moldable with pressing plate respectively may be suitable. Thermoplastic resins such as acryl-based resin, epoxy-based resin, cellulose-based resin, vinyl-based resin, etc.; thermosetting resins such as urethane resin prepared by adding polyisocyanate as a crosslinking agent to acrylpolyol, polyesterpolyol or so each having reactive hydroxy group and crosslinking; melamine-based resin, phenol-based resin; ultraviolet ray setting resins or electron beam setting resins such as epoxy(meth)acrylate, urethane(meth)acrylate or so are usable singly or in combination.

Examples of the method for producing the hologram layer include the followings:
(1) A method in which ultraviolet ray setting type resin or electron beam setting type resin is applied onto the support, which is conveyed between a press cylinder and an impression cylinder, followed by hardening with irradiation of ultraviolet ray or electron beam;
(2) A method in which an ultraviolet setting resin composition or an electron beam setting resin composition and a roughened surface of already existing hologram film are crimped and hardened by irradiating ultraviolet ray or electron beam, thereby separating the hologram film so that the hologram image is transferred, which is disclosed in JP-A-5-232853; and
(3) A method of laminating molten synthetic resin extruded from an extruder die onto one surface of the support between a press cylinder consisting of a cooling roller having a stamper onto which surface is formed a relief hologram and an impression cylinder; each method can be used favorably.

In the case where the finely-roughened state is provided onto the surface of the resin layer by embossing, and when a reflective layer is provided onto the hologram layer as is described below, the embossing finishment may be appropriate either before or after the formation of the reflective layer.

[Reflective Layer]

Further, by providing the reflective layer, the hologram pattern can be clarified. In particular, in the case of a relief hologram, it is preferable to form the reflective layer adjacent to the roughness configuration. In addition, it carries out a role as a reflective support in an occasion of visually recognizes the birefringence pattern utilizing the reflection. Viewing from the hologram layer, the patterned optically anisotropic layer may be provided either onto the surface of the same side of the support as the reflective layer, or onto the surface of the opposite side of the support to the reflective layer.

Description in JP-A-2004-177636 and JP-A-2005-91786 can be referred to about the formation of the reflective layer.

Regarding with the reflective layer, a reflective metal thin film or a transparent thin film having a different refractive index from the hologram layer is usable in addition to a metal layer such as aluminum or silver.

Examples of the metals used for the metal layer include aluminum, silver and so on. The metal layer may be formed in accordance with a vacuum film-formation or a foil pressing of metal foil. Alternatively, the metal layer may be formed by printing ink such as gold or silver. The metal layer is not necessarily a complete mirror plane, and a matte finishing may be carried out on the surface.

The thin film to be used as the reflective layer may be either monolayer film or multilayer films. The thin film to be used as the reflective layer can be produced in accordance with, for example, any one of a physical vapor deposition method and a chemical vapor deposition method.

Regarding with the reflective metal thin film, Al, Cr, Ni, Ag, Au or so can be preferably used.

The thin film prepared by using a material having a large refractive index difference with respect to the resin forming the hologram layer is preferable as the transparent thin film. Examples of the material having large refractive index include titanium oxide, zirconium oxide, zinc sulfide, indium oxide and so on. On the contrary, examples of the material having small refractive index include silicon dioxide, magnesium fluoride, calcium fluoride, aluminum fluoride and so on.

Although the film thickness is different depending on the material to be used, it can be arbitrarily selected within the range of, for example, from 50 to 4000 Å, preferably from 100 to 1000 Å.

In the case where the birefringence pattern is visually recognized with reflection, it is preferable to use a reflective metal layer or a reflective metal thin film as the reflective layer. In the case where the birefringence pattern is visually recognized with reflection, and when the transparent thin film is used, it is preferable to provide an extra layer such as the reflective metal layer or the reflective metal thin film. In the case where the birefringence pattern must be visually recognized with transmission, the transparent thin film can be used as the reflective layer.

[Adhesive Layer]

The medium for preventing forgery of the present invention comprising the hologram layer or the reflective layer prepared as the above description may have an embodiment capable of attaching to articles by further providing an adhesive layer. Regarding with the adhesive layer, those adhering targets to be adhered can be formed using various kinds of adhesive agents.

In the case where the medium for preventing forgery of the present invention is used as the transfer foil capable of being transferred to other articles, the heat sensitive adhesive agents nominated in the items of the above-mentioned adhesive layer for transfer can be favorably used.

Description in JP-A-2007-69472 can be referred to when the medium for preventing forgery of the present invention is to be adhered to the materials in accordance with a dry lamination method or a non solvent lamination method. It may be attached to the articles by subjecting it to a seal finishing as is described below.

[Surface Protective Film]

The medium for preventing forgery may further comprise a protective film over the most upper surface. The protective film may be formed in the same manner as the above mentioned surface protecting layer. Further, the support for the patterned birefringent product may serve as the protection film as the foregoing description.

It is preferable that the patterned optically anisotropic layer is the most upper surface layer to be used as a medium for preventing forgery. However, when an injury resistant property of the patterned optically anisotropic layer is poor, it is preferable to provide the protective layer over the surface.

Depending on the retardation or the film thickness of the protective film, following problems will appear: an extra phase contrast occurs and gives constraint in the latent image pattern; or at least a part of the medium for preventing forgery becomes easily to be separated.

[Medium for Preventing Forgery]

The medium for preventing forgery of the present invention can be used as commodity packages such as a security thread, a label for preventing forgery, a wrapping paper or so.

For example, description in JP-A-10-226996 can be referred to as a method for producing the security thread. As another embodiment, conducting lamination or foil pressing onto an arbitrary support enables to be used as a paper-like label or a film-like label. In addition, punching into predetermined configuration after providing a pressure-sensitive adhesive layer and a releasing paper enables to be used as a sticker or a seal.

Such a medium for preventing forgery can be used by endowing to articles such as various certificates, an identification card, securities, and so on. Also, usages for commodity packages for high-quality brand products, cosmetics, medicines, tobaccos, and so on are favorably suitable in brand protection.

The present invention is contemplated for providing a medium for preventing forgery composed of a combination of a hologram and a birefringence pattern, wherein the effect of preventing forgery is large and a load for producing the medium is small.

The present invention provides a medium for preventing forgery made by laminating a hologram and a patterned optically anisotropic layer, wherein the effect of preventing forgery is large and a load for producing the medium is small.

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

EXAMPLES

Preparation of Sample (Preparation of Coating Liquid AL-1 for Alignment Layer)

The composition below was prepared, filtered through a polypropylene filter having a pore size of 30 μm, and the filtrate was used as a coating liquid AL-1 for forming an alignment layer.

| Composition of Coating Liquid for Alignment layer | (% by mass) |
|---|---|
| Polyvinyl alcohol (trade name: PVA205, manufactured by Kuraray Co., Ltd.) | 3.21 |
| Polyvinylpyrrolidone (trade name: Luvitec K30, manufactured by BASF) | 1.48 |
| Distilled water | 52.10 |
| Methanol | 43.21 |

(Preparation of Coating Liquid LC-1 for Optically Anisotropic Layer)

The composition below was prepared, filtered through a polypropylene filter having a pore size of 0.2 μm, and the filtrate was used as coating liquid LC-1 for forming an optically anisotropic layer.

LC-1-1 is a liquid crystalline compound having two reactive groups, one of which is acrylic group, i.e. a radically reactive group, and the other of which is oxetanyl group, i.e. a cationically reactive group.

LC-1-2 is a disk-shaped compound added for the purpose of orientation control. LC-1-2 was synthesized according to the method described in Tetrahedron Lett., Vol. 43, p. 6793 (2002).

| Composition of Coating Liquid for Optically Anisotropic Layer | (% by mass) |
|---|---|
| Rod-like liquid crystal (LC-1-1) | 32.59 |
| Horizontal orientation agent (LC-1-2) | 0.02 |
| Cationic photopolymerization initiator (trade name: CPI100-P, SAN-APRO Co., Ltd.) | 0.66 |
| Polymerization control agent (trade name: IRGANOX1076, Chiba Speciality Chemicals Co., Ltd.) | 0.07 |
| Methyl ethyl ketone | 66.66 |

(LC-1-1)

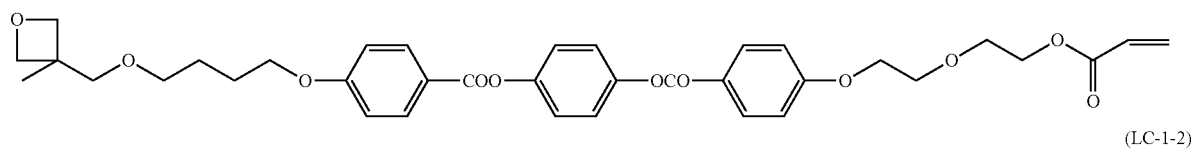

(LC-1-2)

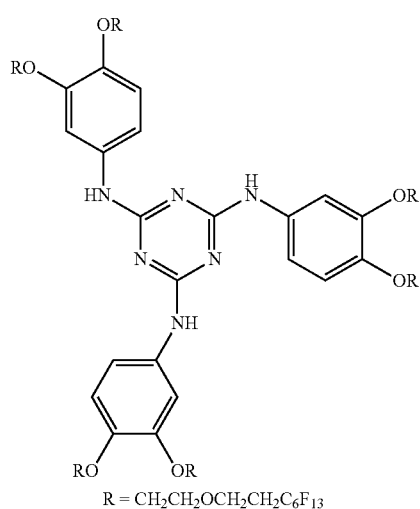

$R = CH_2CH_2OCH_2CH_2C_6F_{13}$ (Preparation of Photopolymerization Initiator-Containing Coating Liquid AD-1 for Forming a Post-Treatment Layer)

The composition below was prepared, filtered through a polypropylene filter having a pore size of 0.2 μm, and the filtrate was used as photopolymerization initiator-containing coating liquid AD-1 for forming a post-treatment layer.

| Composition of photopolymerization initiator-containing coating liquid for forming a post-treatment layer | (% by mass) |
|---|---|
| Random copolymer of benzyl methacrylate/methacrylic acid/methyl methacrylate (copolymerization ratio (molar ratio) = 35.9/22.4/41.7, weight-average molecular weight = 38,000) | 8.05 |
| KAYARAD DPHA (trade name, manufactured by Nippon Kayaku) | 4.83 |
| Radical polymerization initiator (2-trichloromethyl-5-(p-styrylstyryl)-1,3,4-oxadiazole) | 0.12 |
| Hydroquinone monomethyl ether | 0.002 |
| Megafac F-176PF (trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Preparation of Photopolymerization Initiator-Containing Coating Liquid AD-2 for Forming a Post-Treatment Layer)

The composition below was prepared, filtered through a polypropylene filter having a pore size of 0.2 μm, and the filtrate was used as photopolymerization initiator-containing coating liquid AD-2 for forming a post-treatment layer.

| Composition of Photopolymerization initiator-containing coating liquid for forming a post-treatment layer | (% by mass) |
|---|---|
| Radical polymerization initiator (2-trichloromethyl-5-(p-styrylstyryl)-1,3,4-oxadiazole) | 2.0 |
| Methyl ethyl ketone | 98.0 |

(Production of Sheet 1 Coated with Optically Anisotropic Layer)

A rubbing treatment along machine direction (MD) direction was carried out on polyethylene terephthalate film with a thickness of 16 μm. Next, the coating liquid for optically anisotropic layer, LC-1, was applied to the surface using a wire bar coater, dried under heating at 105° C. on the surface of the film for 2 minutes, to thereby obtain a layer of a liquid crystal phase. The coated layer was then illuminated in the air atmosphere by ultraviolet radiation by using a 160 mW/cm$^2$, air-cooled metal halide lamp (product of Eyegraphics Co., Ltd.), so as to fix the alignment state of the phase to thereby obtain a 3.5-μm-thick optically anisotropic layer. The ultraviolet ray used was 100 mW/cm$^2$ illuminance in the range of UV-A (integrated value in the wavelength between 320 nm and 400 nm), and 80 mJ/cm$^2$ irradiation energy in the range of UV-A. The optically anisotropic layer was formed of polymer which was solid at 20° C., and presented MEK (methyl ethyl ketone)-resistance.

(Production of Sheet 2 Coated with Optically Anisotropic Layer)

Onto polyethylene terephthalate film with the thickness of 16 μm that was subjected to a gelatin undercoating treatment, the coating liquid AL-1 for the alignment layer was applied using a wire bar and then, it was dried. A rubbing treatment along machine direction (MD) was carried out on the resultant film. Further, an optically anisotropic layer was formed in the same manner as the sheet 1 coated with the optically anisotropic layer using the coating liquid LC-1 for optically anisotropic layer.

(Production of Birefringent Patterned Sheet 1)

The photopolymerization initiator-containing coating liquid AD-2 for forming a post-treatment layer was applied onto the sheet 1 coated with the optically anisotropic layer and the initiator was impregnated into the liquid crystal layer. The sheet 1 was irradiated at an exposure intensity of 6.25 mW/cm$^2$ for 8.2 seconds by using M-3L mask aligner manufactured by Mikasa and a photomask I having four regions different in density. The photomask I had four regions I-A, I-B, I-C, and I-D. The region I-A has a shape of the right and left inversion image of character A, the region I-B has a shape of the right and left inversion image of character B, and the region I-C has a shape of the right and left inversion image of character C. The region I-D is light-shielded in the part except it. Transmittances with respect to ultraviolet radiation of λ=365 nm in each region are shown in Table 1.

TABLE 1

| Region | Transmittance (%) |
|---|---|
| I-A | 20 |
| I-B | 33 |
| I-C | 96 |

Afterwards, the patterned sheet 1 was subjected to baking for 10 minutes in the clean oven which was set at 200° C.

(Production of Birefringent Patterned Sheet 2)

The photopolymerization initiator-containing coating liquid AD-1 for forming an post-treatment layer was applied onto the sheet 1 coated with the optically anisotropic layer, followed by drying it to form the post-treatment layer with the thickness of 1.2 μm. Then, patterned light exposure and baking were carried out in the same manner as the birefringent patterned sheet 1.

(Production of Birefringent Patterned Sheet 3)

The birefringent patterned sheet 3 was produced in the same manner as the birefringent patterned sheet 2 except that the sheet 2 coated with the optically anisotropic layer was used instead of the sheet 1 coated with the optically anisotropic layer.

(Production of Transfer Foil 1 for Preventing Forgery)

FDFC 150 varnish (manufactured by Toyo Ink Co., Ltd.) was applied onto the birefringent patterned sheet 1. The dry film thickness was 2 μm. Then, by ultraviolet radiation in the state of making the coated surface into contact with a relief hologram mold, fine roughness was formed on the surface. Subsequently, after separating the mold, an aluminum layer with the thickness of 50 nm was vacuum vapor deposited on the hologram layer. By applying hot melt series adhesive agent up to the thickness of 2 μm over the aluminum layer, transfer foil 1 for preventing forgery with the aspect shown in FIG. 3(a) was obtained.

(Production Transfer Foil 2 for Preventing Forgery)

Polymethylmethacrylate was applied onto the birefringent patterned sheet 2. The dry film thickness was 2 μm. Then, by bringing the coated surface into contact with a relief hologram mold, the surface was made to have fine roughness. Subsequently, an aluminum layer with the thickness of 50 nm was vacuum vapor deposited on the hologram layer. By applying hot melt series adhesive agent over the aluminum layer, the transfer foil 2 for preventing forgery with the aspect shown in FIG. 3(a) was obtained.

(Using Method of Transfer Foil 1 or 2 for Preventing Forgery)

After hot stamping the resultant transfer foil 1 or 2 for preventing forgery onto a printed cardboard, PET as the temporary support was separated. Carrying out punching finish to the resultant, a straight carton was produced. The hologram is observed with the naked eye without using the polarizing plate, however, a black character A, a cyan character B, and an yellow character C are observed through a linearly polarizing plate, resultantly a package enabling to visualize multicolor latent images was obtained.

The transfer foil 1 or 2 for preventing forgery is used as a label effective for authentification decision of certificates or brand protection. Hereinafter, the transfer foil 1 or 2 for preventing forgery is referred to medium 1 or 2 for preventing forgery, respectively.

(Production of Medium 3 for Preventing Forgery)

After transferring the birefringent patterned sheet 2 onto Lippmann hologram using an adhesive agent for dry laminating, the temporary support was separated. Similarly as the medium 1 for preventing forgery, a label (medium for preventing forgery with the aspect shown in FIG. 4) which is effective for authentification decision of certificates or brand protection was obtained.

(Production of Medium 4 for Preventing Forgery)

Reflection hologram foil manufactured by KURZ JAPAN LTD was hot stamped onto a printed card paper. After transferring the birefringent patterned sheet 3 onto a hologram using an adhesive agent for dry laminating, the temporary support was separated. In this occasion, the separation was carried out at the interface between the alignment layer and PET. Although the alignment layer was colored a little by the heat treatment, a label (medium for preventing forgery with the aspect shown in FIG. 4) which is effective for authentification decision of certificates or brand protection was obtained similarly as the medium 1 for forgery prevention.

(Production of Medium 5 for Preventing Forgery)

The photopolymerization initiator-containing coating liquid AD-1 for forming a post-treatment layer was coated onto the sheet 1 coated with the optically anisotropic layer, followed by drying it to form the post-treatment layer with the thickness of 1.2 μm. After transferring the resultant onto an art paper printed with silver ink, the temporary support was separated. Then, patterned light exposure and baking were carried out in the same manner as the birefringent patterned sheet 1. However, the patterned light exposure was carried out so that each character is exposed to light without inverting right and left. Further, after hot stamping the commercially available transparent hot stamping foil onto the resultant, the medium 5 for forgery prevention with the aspect shown in FIG. 5 was obtained.

Production of Medium 6 for Preventing Forgery)

After transferring the birefringent patterned sheet 2 onto art paper printed with silver ink using an adhesive agent for dry laminating, the temporary support was separated. Further, after hot stamping the transparent hot stamping foil manufactured by KURZ JAPAN LTD onto the resultant, the medium 6 for forgery prevention with the aspect shown in FIG. 5 was obtained.

(Production of Medium 7 for Preventing Forgery)

The optically anisotropic layer and photopolymerization initiator-containing coating liquid AD-1 for post-treatment layer formation were applied in the same manner as the birefringent patterned sheet 3 except that the support was replaced from the undercoated PET film with the thickness of 16 μm into glass on to which the aluminum layer with the thickness of 50 nm was vapor deposited. Then, patterned light exposure and baking were carried out in the same manner as the birefringent patterned sheet 3. However, the patterned light exposure was carried out so that each character is exposed to light without inverting right and left. FDFC150 varnish (manufactured by Toyo Ink Co., Ltd.) was applied onto the resultant. The dry film thickness was 2 μm. Then, by ultraviolet radiation in the state of making the coated surface into contact with a relief hologram mold, fine roughness was formed on the surface and the medium 7 for forgery prevention with the aspect shown in FIG. 6 was obtained.

(Production of Medium 8 for Preventing Forgery)

The medium 8 for preventing forgery with the aspect shown in FIG. 6 was produced in the same manner as the medium 7 for preventing forgery except that the support was replaced from glass onto which the aluminum layer with the thickness of 50 nm was vapor deposited to the undercoated PET film with the thickness of 25 μm.

(Production of Transfer Foil 9 for Preventing Forgery)

The transfer foil 9 for preventing forgery with the aspect shown in FIG. 7(*a*) was produced in the same manner as the transfer foil 1 for preventing forgery except that ZnS was vacuum vapor deposited up to the thickness of 400 nm instead of the aluminum layer with the thickness of 50 nm.

(Using Method of Transfer Foil 9 for Preventing Forgery)

The transfer foil 9 for preventing forgery was thermally and pressingly adhered onto a printed polypropylene film. Although the shrink wrapping film as thus prepared was usual hologram shrink film observed with the naked eye, three-color characters A, B and C were visually recognized when the specimens were sandwiched between two pieces of polarizing plate. In another case, when a commodity having a metallic reflection part was in the shrink wrapping film, a latent image was observed only by holding the polarizing plate over the commodity. When such a shrink wrapping film is used as a package of the commodity, it is effective for brand protection.

(Production of Medium 10 for Preventing Forgery)

The transparent medium 10 for preventing forgery with the aspect shown in FIG. 8 was obtained by thermally and pressingly adhering the transparent hologram foil manufactured by KURZ JAPAN LTD and the birefringence patterned sheet 3 sequentially onto the printed polyethylene film.

(Production of Medium 11 for Preventing Forgery)

The transparent medium 11 for preventing forgery with the aspect shown in FIG. 9 was obtained by thermally and pressingly adhering the birefringence patterned sheet 2 and the transparent hologram foil manufactured by KURZ JAPAN LTD sequentially onto the printed polypropylene film.

(Production of Medium 12 for Preventing Forgery)

The transparent medium 12 for preventing forgery with the aspect shown in FIG. 10 was obtained by thermally and pressingly adhering the birefringence patterned sheet 1 and the transparent hologram foil manufactured by KURZ JAPAN LTD onto both surfaces of the printed polypropylene film.

(Using Method of Media 9 to 12 for Preventing Forgery)

Similarly as the transfer foil of the medium 9 for preventing forgery, it can be suitably used for the commodity package.

(Production of Medium 13 for Preventing Forgery)

The medium 13 for preventing forgery with the aspect shown in FIG. 11 was produced in the same manner as the medium 7 for preventing forgery except that the aluminum layer in the medium 7 for preventing forgery was removed.

(Production of Medium 14 for Preventing Forgery)

The medium 8 for preventing forgery was slit into threads each having the width of 2 mm by means of a micro slitter. They could be favorably used as security threads.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-156593 filed in Japan on Jun. 16, 2008, which is entirely herein incorporated by reference.

What we claim is:

1. A medium for preventing forgery, comprising:
    at least one reflective layer;
    a hologram layer, and
    at least one patterned optically anisotropic layer,
    wherein the patterned optically anisotropic layer comprises two or more regions whose optical axes are in the same direction but whose birefringence properties are different, and
    wherein all the regions are formed of the same composition.

2. The medium for preventing forgery according to claim 1, wherein a latent image consisting of three or more colors is made visible by observation through a polarizing plate.

3. The medium for preventing forgery according to claim 1, wherein the patterned optically anisotropic layer is a layer formed by polymerizing a liquid crystalline compound.

4. The medium for preventing forgery according to claim 3, comprising a layer formed by a composition containing a polymerization initiator that initiates polymerization of at least a part of the liquid crystalline compound, which layer is adjacent to the patterned optically anisotropic layer.

5. The medium for preventing forgery according to claim 1, wherein the hologram layer and at least one patterned optically anisotropic layer are adjacent to with each other.

6. The medium for preventing forgery according to claim 1, which is a security thread.

7. The medium for preventing forgery according to claim 1, which is a label for preventing forgery.

8. The medium for preventing forgery according to claim 1, wherein the patterned optically anisotropic layer is prepared from an optically anisotropic layer formed by coating and drying a solution containing a liquid crystalline compound at least having a radically polymerizable group and a cationically polymerizable group, and a retardation disappearance temperature of the optically anisotropic layer rises by light exposure.

9. The medium for preventing forgery according to claim 8, wherein the radically polymerizable group is an acrylic group, or a methacrylic group, and the cationically polymerizable group is a vinyl ether group, an oxetane group, or an epoxy group.

* * * * *